US011447601B2

(12) United States Patent
Strand et al.

(10) Patent No.: US 11,447,601 B2
(45) Date of Patent: *Sep. 20, 2022

(54) POLYESTER COMPOSITIONS WHICH COMPRISE TETRAMETHYLCYCLOBUTANEDIOL AND ETHYLENE GLYCOL FOR CALENDERING

(71) Applicant: Eastman Chemical Company, Kingsport, TN (US)

(72) Inventors: Marc Alan Strand, Kingsport, TN (US); Robert Erik Young, Kingsport, TN (US); James Thomas Goetz, Kingsport, TN (US); Douglas Weldon Carico, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/326,283

(22) PCT Filed: Aug. 17, 2017

(86) PCT No.: PCT/US2017/047374
§ 371 (c)(1),
(2) Date: Feb. 18, 2019

(87) PCT Pub. No.: WO2018/035341
PCT Pub. Date: Feb. 22, 2018

(65) Prior Publication Data
US 2019/0211145 A1 Jul. 11, 2019

Related U.S. Application Data

(60) Provisional application No. 62/546,328, filed on Aug. 16, 2017, provisional application No. 62/546,189, (Continued)

(51) Int. Cl.
*C08G 63/183* (2006.01)
*C08J 5/18* (2006.01)
(Continued)

(52) U.S. Cl.
CPC .......... *C08G 63/183* (2013.01); *B29C 55/005* (2013.01); *B29C 55/08* (2013.01); *B29C 55/12* (2013.01); *B29C 55/18* (2013.01); *B32B 27/08* (2013.01); *B32B 27/12* (2013.01); *B32B 27/18* (2013.01); *B32B 27/205* (2013.01); *B32B 27/22* (2013.01); *B32B 27/36* (2013.01); *C08G 63/199* (2013.01); *C08G 63/85* (2013.01); *C08J 5/18* (2013.01); *B29K 2067/00* (2013.01); *B32B 2262/02* (2013.01); *B32B 2262/101* (2013.01); *B32B 2262/106* (2013.01); *B32B 2264/10* (2013.01); *B32B 2307/3065* (2013.01);
(Continued)

(58) Field of Classification Search
CPC .......... C08K 5/01; C08K 5/005; C08K 5/521; B29C 55/005; B29C 55/12; B29C 55/18; B29C 55/08; B29K 2067/00; B32B 2262/02; B32B 2262/101; B32B 2262/106; B32B 2264/10; B32B 2307/3065; B32B 2307/40; B32B 2307/41; B32B 2307/71; B32B 2307/732; B32B 2419/04; B32B 2425/00; B32B 2439/70; B32B 2439/80; B32B 2457/12; B32B 2519/00; B32B 27/08; B32B 27/12; B32B 27/205; B32B 27/22; B32B 27/36; B32B 27/18; C08G 63/183; C08G 63/199; C08G 63/83; C08G 63/85; C08J 2367/02; C08J 5/18; C08L 67/02
See application file for complete search history.

(56) References Cited

U.S. PATENT DOCUMENTS 2,720,507 A 10/1955 Caldwell
3,249,652 A 5/1966 Quisenberry
(Continued)

FOREIGN PATENT DOCUMENTS

CA 740050 A 8/1966
EP 0 214 859 A2 3/1987
(Continued)

OTHER PUBLICATIONS

ASTM D256; "Standard Test Methods for Determining the Izod Pendulum Impact Resistance of Plastics"; Published Nov. 2018.
(Continued)

*Primary Examiner* — Frances Tischler
*Assistant Examiner* — Gennadiy Mesh
(74) *Attorney, Agent, or Firm* — Tammye L. Taylor Polk; C. Stuart Everett; Robert C. Morriss

(57) ABSTRACT

Calendered films or sheets obtained from a composition comprising at least one polyester which has the L* color value of greater than 90 and comprises terephthalic acid residues, optional aromatic and/or aliphatic dicarboxylic acid residues having up to 20 carbon atoms; glycol component comprising 2,2,4,4-tetramethyl-1,3-cyclobutanediol residues and ethylene glycol residues; a catalyst/stabilizer component which comprises titanium atoms, manganese atoms, phosphorous atoms; fillers; release additives and does not comprises tin atoms. Calendered films or sheets can be used in a wide range of applications including packaging, pool liners, graphic arts, transaction cards, security cards and others.

7 Claims, 3 Drawing Sheets

Related U.S. Application Data filed on Aug. 16, 2017, provisional application No. 62/546,320, filed on Aug. 16, 2017, provisional application No. 62/546,185, filed on Aug. 16, 2017, provisional application No. 62/520,214, filed on Jun. 15, 2017, provisional application No. 62/520,211, filed on Jun. 15, 2017, provisional application No. 62/376,557, filed on Aug. 18, 2016, provisional application No. 62/376,473, filed on Aug. 18, 2016.

(51) Int. Cl.

| | | |
|---|---|---|
| *C08G 63/199* | (2006.01) | |
| *B29C 55/00* | (2006.01) | |
| *B29C 55/18* | (2006.01) | |
| *B32B 27/18* | (2006.01) | |
| *B32B 27/08* | (2006.01) | |
| *B32B 27/12* | (2006.01) | |
| *B32B 27/36* | (2006.01) | |
| *B32B 27/20* | (2006.01) | |
| *B32B 27/22* | (2006.01) | |
| *B29C 55/08* | (2006.01) | |
| *B29C 55/12* | (2006.01) | |
| *C08G 63/85* | (2006.01) | |
| *B29K 67/00* | (2006.01) | |
| *C08G 63/83* | (2006.01) | |
| *C08K 5/00* | (2006.01) | |
| *C08K 5/521* | (2006.01) | |

(52) U.S. Cl.
CPC ....... *B32B 2307/40* (2013.01); *B32B 2307/41* (2013.01); *B32B 2307/71* (2013.01); *B32B 2307/732* (2013.01); *B32B 2419/04* (2013.01); *B32B 2425/00* (2013.01); *B32B 2439/70* (2013.01); *B32B 2439/80* (2013.01); *B32B 2457/12* (2013.01); *B32B 2519/00* (2013.01); *C08G 63/83* (2013.01); *C08J 2367/02* (2013.01); *C08K 5/005* (2013.01); *C08K 5/521* (2013.01)

(56) References Cited

U.S. PATENT DOCUMENTS

| | | | |
|---|---|---|---|
| 3,313,777 A | 4/1967 | Elam et al. | |
| 3,426,754 A | 2/1969 | Bierenbaum et al. | |
| 3,772,405 A | 11/1973 | Hamb | |
| 3,907,754 A | 9/1975 | Tershansy et al. | |
| 3,944,699 A | 3/1976 | Mathews et al. | |
| 3,962,189 A * | 6/1976 | Russin ................... | C08G 63/82 528/277 |
| 4,010,145 A * | 3/1977 | Russin ................... | C08G 63/82 528/280 |
| 4,138,459 A | 2/1979 | Brazinsky et al. | |
| 4,263,425 A | 4/1981 | Rothe et al. | |
| 4,582,752 A | 4/1986 | Duncan | |
| 4,632,869 A | 12/1986 | Park et al. | |
| 4,745,174 A | 5/1988 | Pruett et al. | |
| 4,770,931 A | 9/1988 | Pollock et al. | |
| 5,017,680 A | 5/1991 | Sublett | |
| 5,106,944 A | 4/1992 | Sublett | |
| 5,176,954 A | 1/1993 | Keller et al. | |
| 5,372,864 A | 12/1994 | Weaver et al. | |
| 5,384,377 A | 1/1995 | Weaver et al. | |
| 5,435,955 A | 7/1995 | Kamei et al. | |
| 5,654,347 A | 8/1997 | Khemani et al. | |
| 5,688,899 A | 11/1997 | Strand et al. | |
| 5,696,176 A | 12/1997 | Khemani et al. | |
| 5,705,575 A | 1/1998 | Kelsey | |
| 5,843,578 A | 12/1998 | Sasaki et al. | |
| 5,859,116 A | 1/1999 | Shih | |
| 5,955,565 A | 9/1999 | Morris et al. | |
| 5,989,663 A | 11/1999 | Morris et al. | |
| 5,998,005 A | 12/1999 | Kanno | |
| 6,004,664 A | 12/1999 | Sasaki et al. | |
| 6,068,910 A | 5/2000 | Flynn et al. | |
| 6,096,854 A | 8/2000 | Morris et al. | |
| 6,187,898 B1 | 2/2001 | Wagner et al. | |
| 6,287,680 B1 | 9/2001 | Sasaki et al. | |
| 6,500,533 B1 | 12/2002 | Kong et al. | |
| 6,500,915 B1 | 12/2002 | Fujimori et al. | |
| 6,551,688 B2 | 4/2003 | Moskala et al. | |
| 6,559,272 B1 | 5/2003 | Jeon et al. | |
| 6,632,390 B1 | 10/2003 | Shelby et al. | |
| 6,649,731 B2 | 11/2003 | Hori et al. | |
| 6,667,383 B2 | 12/2003 | Fujimori et al. | |
| 6,720,085 B2 | 4/2004 | Ito et al. | |
| 6,777,099 B2 | 8/2004 | Tano et al. | |
| 6,787,630 B1 * | 9/2004 | Dominguez De Walter ............... | C08G 63/20 524/81 |
| 6,998,463 B2 | 2/2006 | Fujimori et al. | |
| 7,030,181 B2 | 4/2006 | Moskala et al. | |
| 7,084,234 B2 | 7/2006 | Wilhelm et al. | |
| 7,235,623 B2 * | 6/2007 | Strand ................... | B29C 43/003 528/272 |
| 7,300,999 B2 | 11/2007 | Deiss et al. | |
| 7,332,564 B2 | 2/2008 | Fujimori et al. | |
| 7,354,653 B2 * | 4/2008 | Germroth ................ | C08J 5/18 428/221 |
| RE40,571 E | 11/2008 | Ohmatsuzawa et al. | |
| 7,772,362 B2 | 8/2010 | Beall et al. | |
| 7,834,128 B2 | 11/2010 | Fujimori et al. | |
| 8,071,695 B2 * | 12/2011 | Strand ................... | C08L 67/02 525/444 |
| 9,169,388 B2 | 10/2015 | Germroth et al. | |
| 9,315,653 B2 | 4/2016 | Takegami | |
| 11,072,684 B2 * | 7/2021 | Crawford ............. | C08G 63/199 |
| 11,091,586 B2 * | 8/2021 | Crawford ............. | C08G 63/183 |
| 2001/0036545 A1 | 11/2001 | Nishi et al. | |
| 2003/0068453 A1 | 4/2003 | Kong | |
| 2003/0144459 A1 * | 7/2003 | Fujimori ................ | C08G 63/82 528/275 |
| 2003/0165671 A1 | 9/2003 | Hashimoto et al. | |
| 2003/0170427 A1 | 9/2003 | Ito et al. | |
| 2005/0096453 A1 * | 5/2005 | Flyn et al. ............. | C08G 63/02 528/272 |
| 2005/0113556 A1 | 5/2005 | Strand et al. | |
| 2005/0136271 A1 * | 6/2005 | Germroth ............... | C08L 67/04 428/480 |
| 2006/0094858 A1 | 5/2006 | Turner et al. | |
| 2006/0111519 A1 * | 5/2006 | Strand ................... | C08L 67/02 525/444 |
| 2006/0121219 A1 | 6/2006 | Shelby et al. | |
| 2007/0142511 A1 | 6/2007 | Crawford | |
| 2007/0142615 A1 | 6/2007 | Crawford | |
| 2009/0227735 A1 | 9/2009 | Shih | |
| 2014/0162042 A1 | 6/2014 | Shih et al. | |
| 2014/0221599 A1 | 8/2014 | Hishimoto et al. | |
| 2019/0211145 A1 * | 7/2019 | Strand ..................... | C08K 5/01 |

FOREIGN PATENT DOCUMENTS

| | | |
|---|---|---|
| EP | 0 581 970 B1 | 8/1998 |
| JP | S5523136 A | 2/1980 |
| JP | 61 037827 A | 2/1986 |
| JP | 63 193822 A | 8/1988 |
| JP | 11 158358 A | 6/1999 |
| JP | 2002 053740 A | 2/2002 |
| JP | 2002 121362 A | 4/2002 |
| JP | 2003 128894 | 5/2003 |
| JP | 3423062 B2 | 7/2003 |
| JP | 2004 181863 A | 7/2004 |
| JP | 3582887 B2 | 8/2004 |
| JP | 5523136 | 4/2014 |
| WO | WO 99 47605 A1 | 9/1999 |
| WO | WO 2002 28967 A1 | 4/2002 |

(56) References Cited

FOREIGN PATENT DOCUMENTS

WO    WO 2008 051320 A1    5/2008
WO    WO 2008 051321 A1    5/2008

OTHER PUBLICATIONS

ASTM D790; "Standard Test Methods for Flexural Properties of Unreinforced and Reinforced Plastics and Electrical Insulating Materials"; Published Jul. 2017.
ASTM D882; "Standard Test Method for Tensile Properties of Thin Plastic Sheeting"; Published Aug. 2018.
ASTM D4440; "Standard Test Method for Plastics: Dynamic Mechanical Properties Melt Rheology"; Published Feb. 2015.
ASTM D6290; "Standard Test Method for Color Determination of Plastic Pellets"; Published Oct. 2018.
ASTM E308; "Standard Practice for Computing the Colors of Objects by Using the CIE System"; Published Sep. 2018.
Bullard, Ralph H., et al.; "Methylphenyl-Stannanes"; Journal of the American Chemical Society, 49(5), 1927, pp. 1369-1373.
Butschli, Jim; "Gauging demand for calendered plastics"; Packaging World, May 31, 1997; retrieved from https://www.packworld.com/article/machinery/fillingsealing/dry-filling/guaging-demand-calendered-plastics on Jun. 18, 2018; 4 pages.
Chambers, Robert F., et al.; "Phenyltin Compounds"; Journal of American Chemical Society, 48(4), 1926, pp. 1054-1062HA.
Clariant International Ltd, "An extensive range of wax additives for engineering resins"/ Waxes Overview Publication No. DA 8240 E; May 2013.
Clariant International Ltd, "Licowax OP Flakes, Partly saponified, ester wax"; Product Data Sheet, edition date Sep. 11, 2015, edition No. 8.
Clariant International Ltd, "Licowax S Flakes, acid wax"; Product Data Sheet, edition date May 7, 2015, edition No. 7.
Dealy, John M. and Kim, Seungoh; "Chapter 7 Gross Melt Fracture in Extrusion"; Polymer Processing Instabilities, Control and Understanding; 2005 pp. 207-236.
Fox, T. G.; "J5. Influence of Diluent and of Copolymer Composition on the Glass Temperature of a Polymer System"; Bull. Am. Phys. Soc., 1, 123 (1956).
Kelsey, Donald R., et al.; "High Impact, Amorphous Terephthalate Copolyesters of Rigid 2,2,4,4-Tetramethyl-1,3-cyclobutanediol with Flexible Diols"; Macromolecules, 33; 2000; pp. 5810-5818.
Kocheshkov, K.A.; "Untersuchungen uber metallorganische Verbindungen, I. Mitteilung: Eine neue Klasse von Arylzinnverbindungen: Phenyl-trihalogen-stannane"; Berichte der deutschen chemischen Gesellschaft (A and B Series); Issue 4, vol. 62; pp. 996-999 (1929)—Original Language.
Krause, Charles A. and Greer, Willard N.; "The Dimethyltin Group and Some of its Reactions"; Journal of the American Chemical Society, 47(10), 1925, pp. 2568-2575.
Krause, Erich and Grosse, A. V.; "Die Chemie Der Metall—Organischen Verbindungen"; Recent Books; 1937, p. 148; 1937, Gobroder-Borntrager.
Meerwein, Hans and Bersin, Theodor; "Investigation of Metal Alcoholates and Orth acid Esters. I. Alkoxo Acids and Their Salts"; Annalen der Chemie, vol. 476; pp. 113-150; Sep. 20, 1929.
Tadmor, Zehev and Gogos, Costas G.; "Chapter 15.1 The Calendering Process"; Principles of Polymers Processing, Second Edition; pp. 865-866; 2006.
Titow, W. V.; "Calendering of PVC, Chapter 18"; PVC Technology, 4th Edition, pp. 803-848 (1984), Elsevier Publishing Co.
Co-pending U.S. Appl. No. 16/326,297, filed Feb. 18, 2019; Emmett Dudley Crawford.
Co-pending U.S. Appl. No. 16/326,292, filed Feb. 18, 2019; Emmett Dudley Crawford.
Co-pending U.S. Appl. No. 16/326,287, filed Feb. 18, 2019; James Carl Williams.
Notification of Transmittal of the International Search Report and the Written Opinion of the International Searching Authority, or the Declaration dated Nov. 7, 2017 received in International Application No. PCT/US2017/047364.
Notification of Transmittal of the International Search Report and the Written Opinion of the International Searching Authority, or the Declaration dated Nov. 7, 2017 received in International Application No. PCT/US2017/047367.
Invitation to Pay Additional Fees and, Where Applicable, Protest Fee dated Nov. 2, 2017 received in International Application No. PCT/US2017/047374.
Notification of Transmittal of the International Search Report and the Written Opinion of the International Searching Authority, or the Declaration dated Feb. 6, 2018 received in International Application No. PCT/US2017/047374.
Notification of Transmittal of the International Search Report and the Written Opinion of the International Searching Authority, or the Declaration dated Nov. 3, 2017 received in International Application No. PCT/US2017/047382.
UPSTO Office Action dated Oct. 26, 2020 received in co-pending U.S. Appl. No. 16/326,297.
USPTO Office Action dated May 27, 2020 received in co-pending U.S. Appl. No. 16/326,292.
USPTO Office Action dated Nov. 4, 2020 received in co-pending U.S. Appl. No. 16/326,292.
USPTO Notice of Allowance dated Apr. 7, 2021 received in co-pending U.S. Appl. No. 16/326,297.
UPSTO Notice of Allowance dated Mar. 18, 2021 received in co-pending U.S. Appl. No. 16/326,292.
USPTO Notice of Allowance dated Apr. 1, 2021 received in co-pending U.S. Appl. No. 16/326,292.
USPTO Office Action dated Nov. 4, 2021 received in co-pending U.S. Appl. No. 16/326,287.
Notice of Allowance and Fee(s) Due dated Feb. 24, 2022 received in U.S. Appl. No. 16/326,387.
Notice of Allowance and Fee(s) Due dated Mar. 23, 2022 received in U.S. Appl. No. 16/326,387.

\* cited by examiner

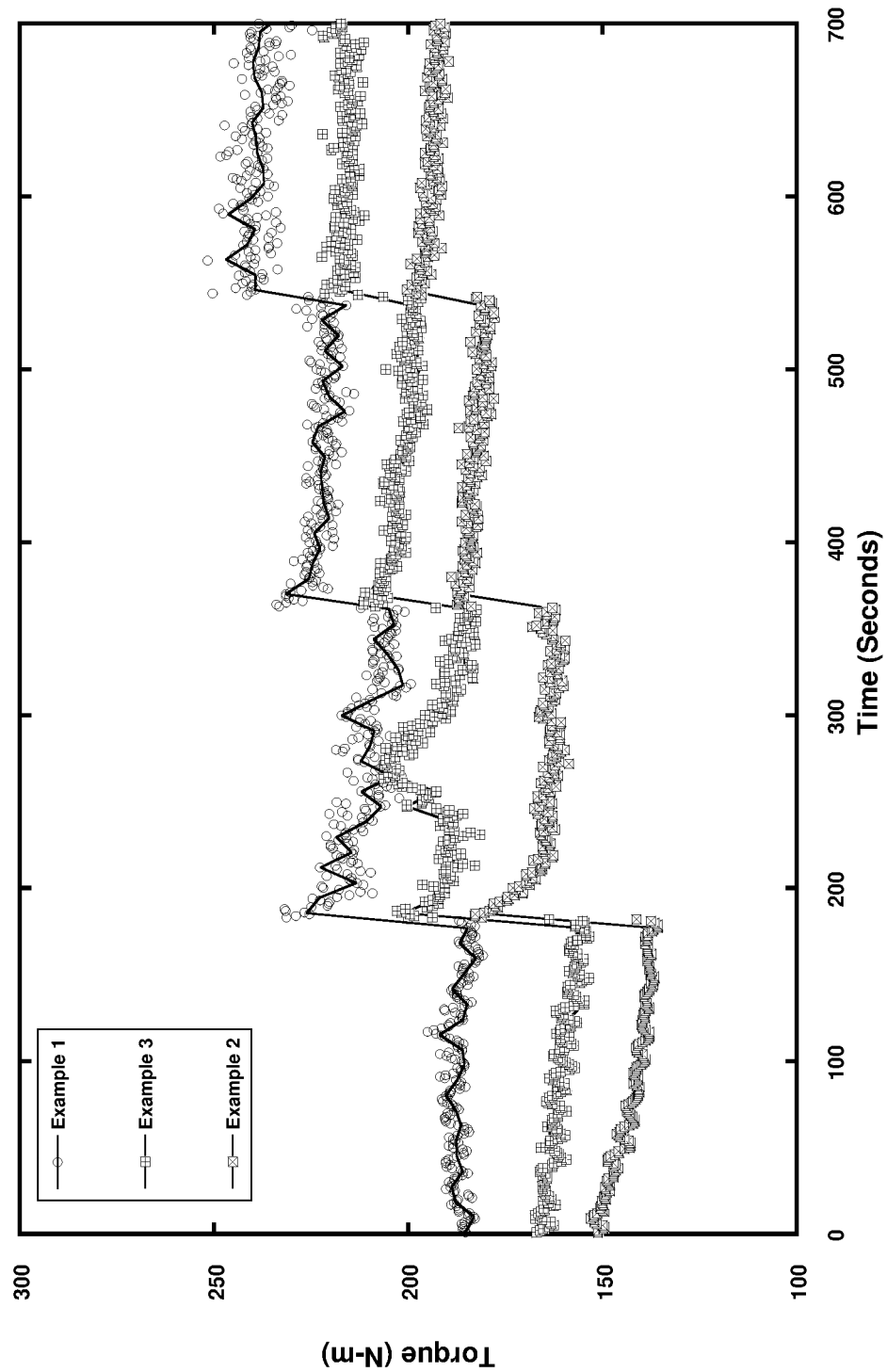

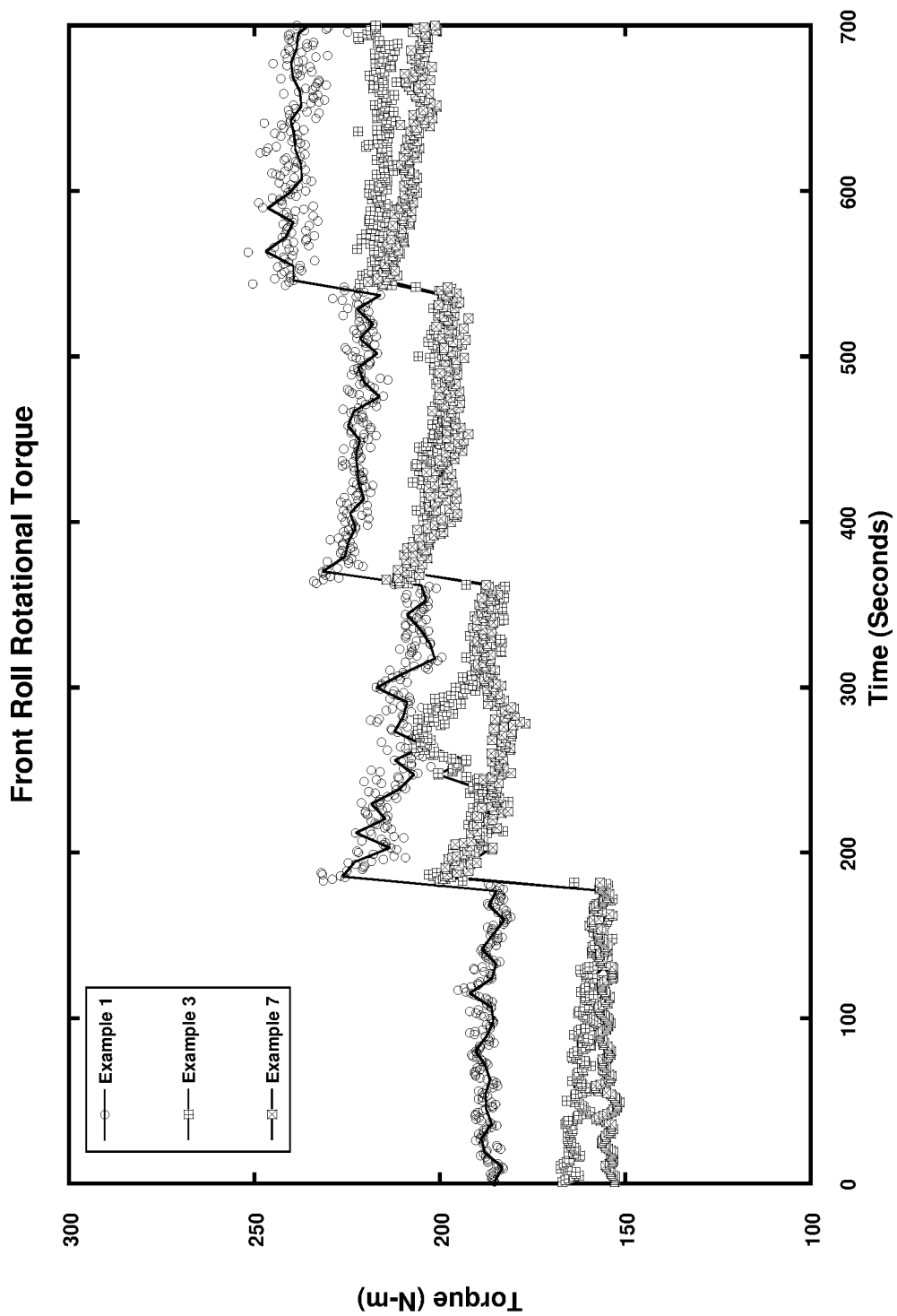

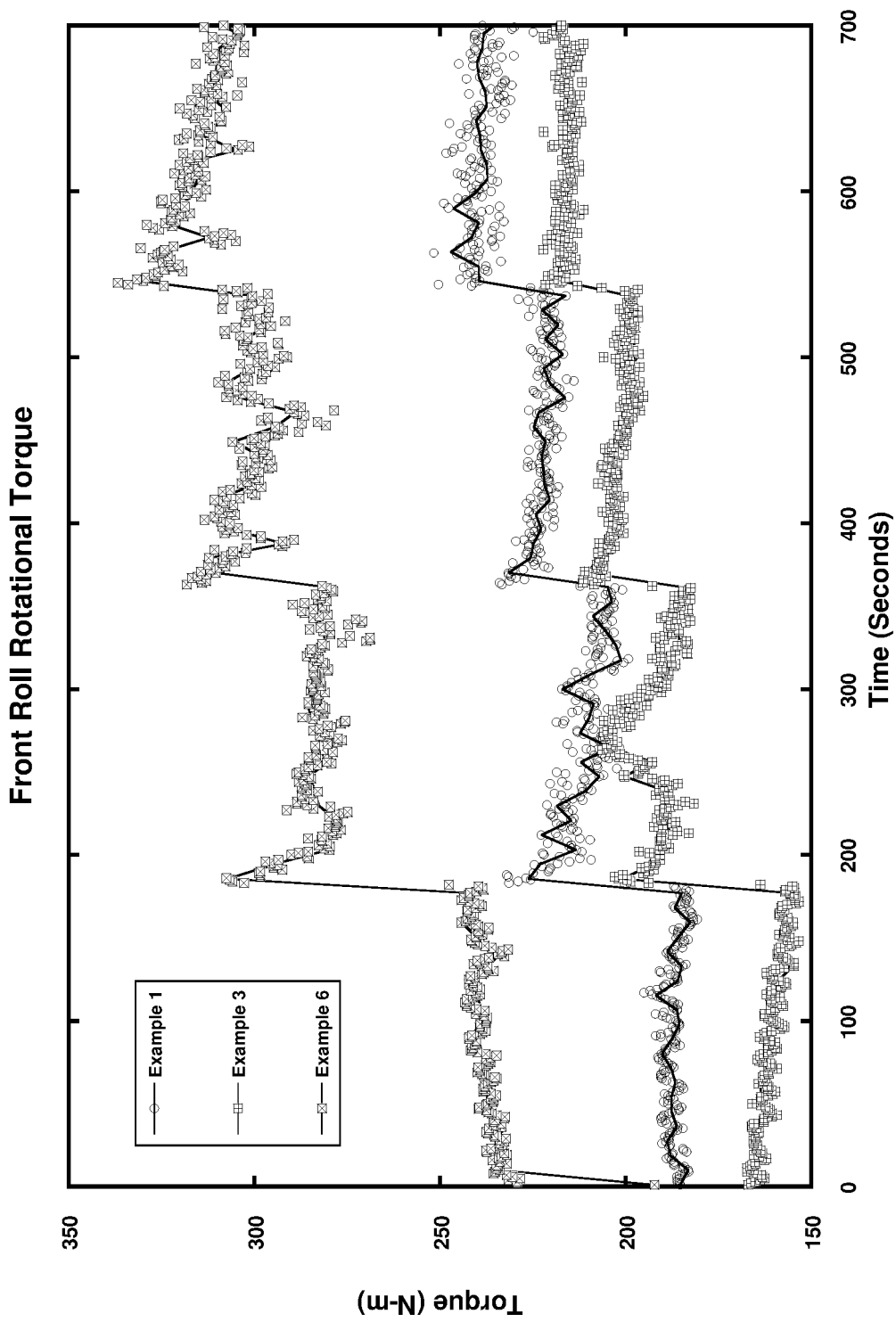

POLYESTER COMPOSITIONS WHICH COMPRISE TETRAMETHYLCYCLOBUTANEDIOL AND ETHYLENE GLYCOL FOR CALENDERING

CROSS-REFERENCE TO RELATED APPLICATION(S)

This application is a national stage filing under 35 USC § 371 of International Application Number PCT/US2017/047374, filed on Aug. 17, 2017; which claims the benefit of the filing date to U.S. Provisional Application Nos. 62/546,328, 62/546,320, 62/546,189, and 62/546,185 all filed on Aug. 16, 2017; U.S. Provisional Application Nos. 62/520,214 and 62/520,211 both filed on Jun. 15, 2017; and U.S. Provisional Application Nos. 62/376,557 and 62/376,473 both filed on Aug. 18, 2016; the entire disclosures of which are incorporated by reference herein.

FIELD

The present disclosure pertains to novel polyester compositions for calendering which comprise tetramethylcyclobutanediol and ethylene glycol and, more specifically, to polyester compositions which enable higher rates of production in calendering processes. This disclosure further pertains to calendering processes for these polyester compositions and to polyester film and/or sheet produced therefrom.

BACKGROUND

Calendering is an economic and highly efficient means to produce film and sheet from plastics such as plasticized and rigid poly(vinyl chloride), abbreviated herein as "PVC", and polypropylene compositions. The calendered films and sheets usually have a thickness ranging from about 2 mils (0.05 mm) to about 80 mils (2.0 mm). Calendered PVC films or sheets are readily thermoformed into various shapes that can be used in a wide range of applications including packaging, pool liners, graphic arts, transaction cards, security cards, veneers, wall coverings, book bindings, folders, floor tiles, and products which are printed, decorated, or laminated in a secondary operation.

By contrast, conventional processing of polyesters into film or sheet involves extruding a polyester melt through a manifold of a flat die. Manual or automatic die lip adjustment is used to control thickness across a web of material. Water-cooled chill rolls are used to quench the molten web and impart a smooth surface finish. Although extrusion processes produce film and sheet of excellent quality, extrusion methods do not have the throughput and economic advantages of calendering processes.

PVC compositions are one of the largest segments of the calendered film and sheet business. Other thermoplastic polymers such as, for example, thermoplastic rubbers, certain polyurethanes, talc-filled polypropylene, acrylonitrile/buta-diene/styrene terpolymers (ABS resins), and chlorinated polyethylene, are sometimes processed by calendering methods. By contrast, polyester polymers such as, for example, poly(ethylene terephthalate), abbreviated herein as "PET", or poly(1,4-butylene terephthalate), abbreviated herein as "PBT", are often difficult to calender successfully. For example, PET polymers with inherent viscosity values of about 0.6 deciliters/gram (abbreviated herein as "dL/g"), typically have insufficient melt strength to perform properly on the calendering rolls. Melt strength is defined as the ability of a polymer to support its weight in the molten state. In calendering, melt strength is related to the ability to remove the film from the roll process without deformation. For example, when calendered, a polymer with low melt strength will quickly sag and hit the floor; whereas, a polymer with high melt strength will maintain its shape for a much longer amount of time and can be further processed. Melt strength is thus important to minimize the amount of "drawdown" and gravity-induced sagging the polymer experiences during the calendering process. Drawdown is defined in calendering as the amount of thickness reduction between the calendering rolls and the take-up system and is expressed as the ratio of the nominal thickness or width dimension as the film exits the calendering rolls with the same dimension at the take up roles. Also, PET and other polyester polymers are prone to crystallize at typical processing temperatures of 160° C. to 180° C., resulting a non-homogeneous mass which also causes high forces on the calender bearings. Increasing processing temperatures will reduce melt viscosity and improve processability. Higher temperatures, however, can cause degradation of the polyester such as, for example, by thermal degradation, hydrolysis of polymer by exposure to atmospheric moisture, and the formation of color bodies. Typical PET polymers also have a tendency to stick to the calendering rolls at higher processing temperatures. The calendering of various polyester compositions and several approaches to these problems has been described, for example, in U.S. Pat. Nos. 5,998,005; 6,068,910; 6,551,688; U.S. patent application Ser. No. 10/086,905; Japan Patent Application Nos. 8-283547; 7-278418; 2000-243055; 10-363-908; 2000-310710; 2001-331315; 11-158358; and World Patent Application No. 02/28967. Although some of these difficulties can be avoided by the careful selection of polymer properties, additives, and processing conditions, calendering of polyesters at high rates of production is often difficult.

The rate of production in a calendering process, usually referred to as line speed, is determined by several factors. Equipment design and capability, for example, will have a large influence on how fast and efficient a calendering process will run. Absent any equipment limitations, however, the line speed and efficiency of a calendering process is highly dependent on the material being run.

The higher the line speed, the greater the chances that melt fracture will occur. Melt fracture gives a rough, frosty or hazy appearance to the material and is the result of the material not being able to respond to the shear applied during the process. Melt fracture occurs whenever the wall shear stress on the calendering roll exceeds a certain value (typically 0.1 to 0.2 MPa) and the onset of melt fracture is often the rate determining step in a calendering process. Shear stress is controlled by the volume throughput or line speed (which dictates the shear rate) and the viscosity of the polymer melt. By reducing either the line speed or the viscosity at high shear rates, the wall shear stress is reduced and the chance for melt fracture is lowered. Reducing shear stress, therefore, will reduce the chances of melt fracture as the line speed of a calendering process is increased. Reducing shear stress and melt fracture in polyesters has been addressed in extrusion processes. For example, U.S. Pat. No. 6,632,390 describes a process for producing a profile extrusion in which the processability of the polyester composition is improved by the addition of a branching agent, which provides increased melt strength and increased high shear thinning. The polyester composition has an inherent viscosity of at least 0.65 dL/g. Polyester polymers, however, often show a relatively flat shear-thinning response (i.e., there is little change in the melt viscosity of the polymer between low and high shear rates) in calendering processes in comparison to polymers typically processed by calendering such as, for example, PVC or polypropylene. Thus, if a polyester with a higher melt viscosity is used to obtain sufficient melt strength, insufficient shear thinning often causes unacceptably high forces on the calender bearings. Increasing the processing temperature can reduce the occurrence of melt fracture in calendering but, as noted above, also can result in polymer degradation and an unsatisfactory polymer melt strength. Thus, the difficulties presented by shear response and melt-strength frequently prevent polyester polymers from being calendered at high line speeds and/or lower processing temperatures where the highest product quality and lowest production cost may be obtained. To address these problems, a polyester that is capable of being calendered at high line speeds and/or at lower processing temperatures is needed.

U.S. Pat. No. 7,235,623 discloses a copolyester with a proper balance of inherent viscosity and branching to provide superior processing characteristics during calendering. The branched copolyester compositions in this disclosure that provide a higher throughput in a calendering process are prepared from polyesters having a crystallization half time of at least 5 minutes, an inherent viscosity of about 0.55 to about 0.75 deciliters/gram (dL/g), a branching monomer, and a release additive.

In the present disclosure, novel polyester compositions containing TMCD and EG have been discovered that provide a higher throughput in calendering processes without the need for a branching monomer or branching agent.

SUMMARY

In the present disclosure, it has also been discovered that certain polyester compositions containing TMCD and EG provide superior processing characteristics during calendering. It has been unexpectedly discovered that polyester compositions that provide a higher throughput in calendering processes may be prepared from polyesters having a crystallization half time of at least 5 minutes, an inherent viscosity of about 0.50 to about 0.80 deciliters/gram (dL/g) and a release additive. The present disclosure provides novel polyester compositions for calendering containing TMCD and EG, which comprise: (a) at least one polyester comprising diacid residues, diol residues; a crystallization half time of at least 5 minutes and an inherent viscosity of about 0.50 to about 0.80 dL/g; and (b) at least one release additive effective to prevent sticking of the polyester to calendering rolls. The novel polyester compositions of the present disclosure have an unexpected combination of excellent melt strength and melt viscosity with a good shear response that allows higher calendering line speeds before melt fracture occurs. Higher calendering line speeds, in turn, provides for more economical production of polyester sheet or film in commercial applications.

Aspect 1 of the present disclosure is a calendered film and/or sheet comprising a polyester composition comprising:
(1) at least one polyester which comprises:
  (a) a dicarboxylic acid component comprising:
    (i) about 80 to about 100 mole % of terephthalic acid residues;
    (ii) about 0 to about 20 mole % of aromatic and/or aliphatic dicarboxylic acid residues having up to 20 carbon atoms; and
  (b) a glycol component comprising:
    (i) about 10 to about 42 mole % 2,2,4,4-tetramethyl-1,3-cyclobutanediol residues; and
    (ii) about 38 to about 90 mole % ethylene glycol residues;
    (iii) about 0 to about 20 mole % of any other modifying glycols; or
  (b) a glycol component comprising:
    (i) about 10 to about 42 mole % 2,2,4,4-tetramethyl-1,3-cyclobutanediol residues; and
    (ii) about 58 to about 90 mole % ethylene glycol residues; and wherein the total mole % of the dicarboxylic acid component is 100 mole %, wherein the total mole % of the glycol component is 100 mole %; and
(2) at least one release additive.

In one embodiment, the preceding polyester has an inherent viscosity from 0.50 to 0.80 dL/g as determined in 60/40 (wt/wt) phenol/tetrachloroethane at a concentration of 0.25 g/50 ml at 25° C.

In one embodiment, the preceding polyester has a Tg of 80° C. to less than 100° C. or a Tg of 80° C. to 98° C. as determined using a TA DSC 2920 from Thermal Analyst Instrument at a scan rate of 20° C./min.

In one embodiment, the preceding polyester has an L* color value of 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

Aspect 2 of the present disclosure is a calendered film and/or sheet comprising a polyester composition comprising:
(1) at least one polyester which comprises:
  (a) a dicarboxylic acid component comprising:
    (i) about 80 to about 100 mole % of terephthalic acid residues;
    (ii) about 0 to about 20 mole % of aromatic and/or aliphatic dicarboxylic acid residues having up to 20 carbon atoms; and
  (b) a glycol component comprising:
    (i) about 30 to about 42 mole % 2,2,4,4-tetramethyl-1,3-cyclobutanediol residues; and
    (ii) about 38 to about 70 mole % ethylene glycol residues; and
    (iii) about 0 to about 20 mole % of other modifying glycols other than 1,4-cyclohexanedimethanol; or about 0 to less than about 20 mole % of 1,4-cyclohexanedimethanol; or
  (b) a glycol component comprising:
    (i) about 30 to about 42 mole % 2,2,4,4-tetramethyl-1,3-cyclobutanediol residues; and
    (ii) about 58 to about 70 mole % ethylene glycol residues; and
    wherein the total mole % of the dicarboxylic acid component is 100 mole %, and wherein the total mole % of the glycol component is 100 mole %; and
(2) at least one release additive.

In one embodiment, the preceding polyester has an inherent viscosity from 0.50 to 0.80 dL/g as determined in 60/40 (wt/wt) phenol/tetrachloroethane at a concentration of 0.25 g/50 ml at 25° C.

In one embodiment, the preceding polyester has a Tg of 100° C. to 110° C. or a Tg greater than 100° C. as determined using a TA DSC 2920 from Thermal Analyst Instrument at a scan rate of 20° C./min.

In one embodiment, the preceding polyester has an L* color value of 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

Aspect 3 of the present disclosure is a calendered film and/or sheet comprising a polyester composition comprising:
(1) at least one polyester which comprises:
  (a) a dicarboxylic acid component comprising:
    (i) about 80 to about 100 mole % of terephthalic acid residues;
    (ii) about 0 to about 20 mole % of aromatic and/or aliphatic dicarboxylic acid residues having up to 20 carbon atoms; and
  (b) a glycol component comprising:
    (i) about 34 to about 40 mole % 2,2,4,4-tetramethyl-1,3-cyclobutanediol residues; and
    (ii) about 50 to about 66 mole % ethylene glycol residues; and
    (iii) 0 to about 10 mole % of any other modifying glycols; or
  (b) a glycol component comprising:
    (i) about 34 to about 40 mole % 2,2,4,4-tetramethyl-1,3-cyclobutanediol residues; and
    (ii) about 60 to about 66 mole % ethylene glycol residues; and
  wherein the total mole % of the dicarboxylic acid component is 100 mole %, and wherein the total mole % of the glycol component is 100 mole %; and
(2) at least one release additive.

In one embodiment, the preceding polyester has an inherent viscosity from 0.50 to 0.80 dL/g or has an inherent viscosity from 0.50 to 0.70 dL/g as determined in 60/40 (wt/wt) phenol/tetrachloroethane at a concentration of 0.25 g/50 ml at 25° C.

In one embodiment, the preceding polyester has a Tg of 100° C. to 110° C. or a Tg greater than 100° C. as determined using a TA DSC 2920 from Thermal Analyst Instrument at a scan rate of 20° C./min.

In one embodiment, the preceding polyester has an L* color value of 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

Aspect 4 of the present disclosure provides a calendered film and/or sheet comprising a polyester composition comprising:
(1) at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 10 to about 30 mole % 2,2,4,4-tetramethyl-1,3-cyclobutanediol residues; and
    (ii) about 50 to about 90 mole % ethylene glycol residues;
    (iii) about 0 to about 20 mole % of any other modifying glycols; or
  (b) a glycol component comprising:
    (i) about 10 to about 30 mole % 2,2,4,4-tetramethyl-1,3-cyclobutanediol residues; and
    (ii) about 50 to about 90 mole % ethylene glycol residues;
    (iii) about 0 to less than 20 mole % of 1,4-cyclohexanedimethanol; or
  (b) a glycol component comprising:
    (i) about 15 to about 30 mole % 2,2,4,4-tetramethyl-1,3-cyclobutanediol residues; and
    (ii) about 70 to about 85 mole % ethylene glycol residues;
  and wherein the total mole % of the dicarboxylic acid component is 100 mole %, wherein the total mole % of the glycol component is 100 mole %; and wherein the inherent viscosity of the polyester is from 0.50 to 0.80 dL/g as determined in 60/40 (wt/wt) phenol/tetrachloroethane at a concentration of 0.25 g/50 ml at 25° C.; and wherein the polyester has a Tg of 80° C. to 105° C. or 80° C. to 100° C. as determined using a TA DSC 2920 from Thermal Analyst Instrument at a scan rate of 20° C./min and
(2) at least one release additive.

Aspect 5 of the present disclosure is a calendered film and/or sheet comprising a polyester composition comprising:
(1) at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 30 to about 42 mole % 2,2,4,4-tetramethyl-1,3-cyclobutanediol residues; and
    (ii) about 38 to about 70 mole % ethylene glycol residues; and
    (iii) about 0 to about 20 mole % of any other modifying glycols; or
  (b) a glycol component comprising:
    (i) about 30 to about 42 mole % 2,2,4,4-tetramethyl-1,3-cyclobutanediol residues; and
    (ii) about 58 to about 70 mole % ethylene glycol residues; and
  wherein the total mole % of the dicarboxylic acid component is 100 mole %, and
  wherein the total mole % of the glycol component is 100 mole %; and
  wherein the inherent viscosity of the polyester is from 0.50 to 0.80 dL/g as determined in 60/40 (wt/wt) phenol/tetrachloroethane at a concentration of 0.25 g/50 ml at 25° C.; and wherein the L* color value for the polyester is 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve; and (2) at least one release additive.

Aspect 6 of the present disclosure is a calendered film and/or sheet comprising a polyester composition comprising:

(1) at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 34 to about 40 mole % 2,2,4,4-tetramethyl-1,3-cyclobutanediol residues; and
  (ii) about 60 to about 66 mole % ethylene glycol residues; and
 wherein the total mole % of the dicarboxylic acid component is 100 mole %, and wherein the total mole % of the glycol component is 100 mole %; and
 wherein the inherent viscosity of the polyester is from 0.50 to 0.70 dL/g as determined in 60/40 (wt/wt) phenol/tetrachloroethane at a concentration of 0.25 g/50 ml at 25° C.; and wherein the polyester has a Tg of 100° C. to 110° C. as determined using a TA DSC 2920 from Thermal Analyst Instrument at a scan rate of 20° C./min; and (2) a release additive.

Aspect 7 of the present disclosure is a calendered film and/or sheet comprising a polyester composition comprising:

(1) at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 10 to about 30 mole % 2,2,4,4-tetramethyl-1,3-cyclobutanediol residues; and
  (ii) about 60 to about 90 mole % ethylene glycol residues;
  (iii) about 0 to about 10 mole % of any other modifying glycols; or
 (b) a glycol component comprising:
  (i) about 14 to about 34 mole % 2,2,4,4-tetramethyl-1,3-cyclobutanediol residues; and
  (ii) about 46 to about 86 mole % ethylene glycol residues;
  (iii) about 0 to less than 20 mole % of the residues of 1,4-cyclohexanedimethanol; and
 wherein the total mole % of the dicarboxylic acid component is 100 mole %, and
 wherein the total mole % of the glycol component is 100 mole %; and wherein the inherent viscosity of the polyester is from 0.50 to 0.80 dL/g as determined in 60/40 (wt/wt) phenol/tetrachloroethane at a concentration of 0.25 g/50 ml at 25° C.; and
 wherein the polyester has a Tg of less than of 100° C.; and (2) a release additive.

In one embodiment, any of the preceding polyesters has a crystallization half-time of greater than 5 minutes, or has a crystallization half-time of greater than 12 minutes, or has a crystallization half-time of greater than 30 minutes.

In one embodiment, the any of the preceding polyester compositions is amorphous.

In one embodiment, the any of the preceding polyester compositions have an inherent viscosity from 0.50 to 0.70 dL/g, 0.60 to 0.70 dL/g or 0.54 to 0.68 dL/g.

In one embodiment, any of the preceding polyester compositions further comprises a branching agent.

In one embodiment, any of the preceding polyester compositions does not comprise a branching agent.

In one embodiment, any of the preceding polyesters comprises said at least one release additive which comprises one or more of: fatty acid amides, metal salts of organic acids, fatty acids, fatty acid salts, fatty acid esters, hydrocarbon waxes, ester waxes, phosphoric acid esters, chemically modified polyolefin waxes; glycerin esters, talc, or acrylic copolymers.

In one embodiment, any of the preceding polyester comprises said at least one release additive which comprises about 0.1 wt % to about 10 wt %, based on the total weight of said polyester composition.

In one embodiment, any of the preceding polyester compositions further comprise (c) a catalyst/stabilizer component which comprises: (i) titanium atoms in the range of 10-50 ppm based on total polymer weight, (ii) manganese atoms in the range of 10-100 ppm based on total polymer weight, and (iii) phosphorus atoms in the range of 10-200 ppm based on total polymer weight.

In one embodiment, any of the preceding polyester compositions further comprise (c) a catalyst/stabilizer component which comprises: (i) titanium atoms in the range of 10-50 ppm based on total polymer weight, and (ii) phosphorus atoms in the range of 10-200 ppm based on total polymer weight.

In one embodiment, any of the preceding polyester compositions further comprise (c) a catalyst/stabilizer component which comprises manganese atoms in the range of 10-100 ppm based on total polymer weight.

In one embodiment, any of the preceding polyester compositions further comprise (c) a catalyst/stabilizer component which comprises tin atoms in the range of 0-20 ppm based on total polymer weight.

In one embodiment, any of the preceding polyester compositions further comprise (c) a catalyst/stabilizer component which comprises tin atoms in the range of 0-5 ppm based on total polymer weight.

In one embodiment, any of the preceding polyester compositions further comprise (c) a catalyst/stabilizer component which comprises no tin atoms or which comprises no intentionally added tin atoms.

In one embodiment, any of the preceding polyester compositions further comprise at least one additive selected from the group consisting of processing aids, plasticizers, stabilizers, impact modifiers, biocides, flame retardants, foaming agents, matting agents, blowing agents, thermal stabilizers, nucleating agents, oxidative stabilizers, UV stabilizers, UV absorbers, minerals, pigments, dyes, colorants, carbon black, talc, $TiO_2$, calcium carbonate, fillers, fibers, chopped fibers, glass fibers, glass, carbon fiber, waxes, fusion promoters, antioxidants, antistatic agents, antiblocking agents, additional release agents, lubricants, mold release agents, phosphorus compounds, slip agents, melt strength enhancers, additional resins, and heat distortion temperature modifiers.

Aspect 8 of the present disclosure is a process for producing a calendered film and/or sheet, comprising calendering a polyester composition according any of the preceding aspects including embodiments through a compressive nip between at least two calendering rolls at calender roll temperature of about 130° C. to about 250° C.

In one embodiment, the calendered film and/or sheet produced according the preceding process has a thickness of 25 um (0.001 inches) to 1000 um (0.04 inches).

In one embodiment, the calendered film and/or sheet produced according the preceding process has an L* color value of 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

In one embodiment, the calendered film and/or sheet produced according the preceding process has a Tg of 100° C. to 110° C. or a Tg greater than 100° C. as determined using a TA DSC 2920 from Thermal Analyst Instrument at a scan rate of 20° C./min.

In one embodiment, the calendered film and/or sheet produced according the preceding process has a Tg of 90° C. to 96° C. or a Tg less than 100° C. as determined using a TA DSC 2920 from Thermal Analyst Instrument at a scan rate of 20° C./min.

One embodiment includes the laminates; decorative laminates; products printed, decorated or laminated in a secondary operation; graphic arts, cards; monolayer cards; multilayer cards; transaction cards, security cards, packaging, packaging for food and non-food products; medical packaging; veneers; wall covering; window coverings; floor tiles; films; window films; stretched films; stretchable films, automotive window films; book bindings; folders; shrink films; printable films; pressure sensitive labels; stationery films; optical films; greenhouse films; photovoltaic cell films; and x-ray films comprising calendered films and/or sheets produced according to the preceding process.

BRIEF DESCRIPTION OF THE DRAWINGS

FIG. 1 illustrates the two roll mill front roll rotational torque for Examples 1, 2 and 3

FIG. 2 illustrates the two roll mill front roll rotational torque for Examples 1, 3 and 7

FIG. 3 illustrates the two roll mill front roll rotational torque for Examples 1, 3 and 6

DETAILED DESCRIPTION

The calendered films and sheets of the present disclosure comprise at least one novel polyester and a release agent or additive. In one embodiment, the novel polyester has a crystallization half-time of greater than 5 minutes, an inherent viscosity from 0.50 to 0.80 dL/g, and a Tg greater than 90° C. In another embodiment, the novel polyester has a crystallization half-time of greater than 5 minutes, an inherent viscosity from 0.50 to 0.80 dL/g, and a Tg greater than 100° C.

Polyester compositions typically have been difficult to incorporate into calendering processes for the production of film or sheet. As discussed above, polyesters heretofore often have not had the proper combination of melt strength and shear thinning to permit calendering at high line speeds and at lower temperatures. The ideal polyester would thus have a high melt strength and a high degree of shear thinning so that the polyester could be run at the high speeds associated with efficient commercial calendering process without sagging and melt fracture.

The present disclosure provides a polyester composition with high melt strength and a high degree of shear thinning making it suitable for use in high speed calendering processes. In some embodiments, the present disclosure provides polyester compositions with high melt strength and high melt viscosity without the addition of a branching agent. Thus, one embodiment of the present disclosure provides a polyester composition for calendering, comprising: (a) at least one polyester comprising diacid residues, diol residues, and optionally a branching agent or branching monomer in which the polyester is a has a crystallization half time of at least 5 minutes and an inherent viscosity of about 0.50 to about 0.80 dL/g; and (b) a at least one release additive. The release additive is effective to prevent sticking of the polyester to calendering rolls. The polyesters of the present disclosure have higher melt strength and a higher degree of shear thinning which allows the novel polyester composition of the present disclosure to be calendered at lower temperatures, at high line speeds, and without excessive drawdown of the resulting film or sheet.

In one embodiment of the present disclosure, the polyester compositions may also comprise one or more plasticizers to increase the flexibility and softness of calendered polyester films and/or sheets, improve the processing of the polyester, and help to prevent sticking of the polyester to the calender rolls. This disclosure also provides a process for film or sheet by calendering the novel polyester compositions and for the film or sheet produced from such calendering processes. In one embodiment, the calendered film and/or sheet of the present disclosure have a thickness in the range of about 2 mils (0.05 mm) to about 80 mils (2 mm). In another embodiment, the calendered film and/or sheet of the present disclosure have a thickness in the range of about of 25 um (0.001 inches) to 1000 um (0.04 inches).

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements.

Polyesters

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, acid chlorides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

Certain polyesters and/or polyester composition(s) of this disclosure formed from terephthalic acid, an ester thereof, and/or mixtures thereof, ethylene glycol and 2,2,4,4-tetramethyl-1,3-cyclobutanediol, and, further comprising certain catalysts and stabilizers, reaction products thereof, and mixtures thereof, can have a unique combination of two or more of the following properties: certain notched Izod impact strengths, certain inherent viscosities, certain glass transition temperature (Tg); certain flexural modulus, good clarity, good color, good thermal stability, good ultrasonic weld strength, and good dish washer durability and mechanical properties for a selected IV. In certain embodiments of this disclosure, certain polyesters and/or polyester compositions of this disclosure can have a unique combination of three or more of certain notched Izod impact strengths, certain inherent viscosities, certain glass transition temperature (Tg); certain flexural modulus, good clarity, good color, good thermal stability, good ultrasonic weld strength, and good dish washer durability and mechanical properties for a selected IV.

In one embodiment, the polyesters may be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid-state polymerization methods. Suitable methods include the steps of reacting one or more dicarboxylic acids with one or more glycols at a temperature of about 100° C. to about 315° C. at a pressure of about 0.1 to about 760 mm Hg for a time sufficient to form a polyester. See U.S. Pat. No. 3,772,405 for methods of producing polyesters, the disclosure of such methods which is incorporated herein by reference.

In one embodiment, the polyesters the present disclosure can be prepared from dicarboxylic acids and diols which react in substantially equal proportions and are incorporated into the polyester polymer as their corresponding residues. The polyesters of the present disclosure, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 2,2,4,4-tetramethyl-1,3-cyclobutanediol, based on the total diol residues, means the polyester contains 25 mole % 2,2,4,4-tetramethyl-1,3-cyclobutanediol residues out of a total of 100 mole % diol residues. Thus, there are 25 moles of 2,2,4,4-tetramethyl-1,3-cyclobutanediol residues among every 100 moles of diol residues.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in this disclosure. In certain embodiments, terephthalic acid residues can make up a portion or all of the dicarboxylic acid component used to form the polyesters useful in this disclosure. In certain embodiments, higher amounts of terephthalic acid can be used in order to produce a higher impact strength polyester. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present disclosure. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in this disclosure can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present disclosure include but are not limited to those having up to 20 carbon atoms, and which can be linear, para-oriented, or symmetrical. Examples of modifying aromatic dicarboxylic acids which may be used in this disclosure include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the present disclosure can be further modified with up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and/or dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the polyesters useful in this disclosure.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

For the desired polyester, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

The polyesters useful in the present disclosure can include but is not limited to residues of 2,2,4,4-tetramethyl-1,3-cyclobutanediol and ethylene glycol being present in one of the following amounts: about 17 to about 30 mole % 2,2,4,4-tetramethyl-1,3-cyclobutanediol and about 70 to about 83 mole % ethylene glycol; about 17 to about 29 mole % 2,2,4,4-tetramethyl-1,3-cyclobutanediol and about 71 to about 83 mole % ethylene glycol; about 17 to about 28 mole % 2,2,4,4-tetramethyl-1,3-cyclobutanediol and about 72 to about 83 mole % ethylene glycol; about 17 to about 27 mole % 2,2,4,4-tetramethyl-1,3-cyclobutanediol and about 73 to about 83 mole % ethylene glycol; about 17 to about 26 mole % 2,2,4,4-tetramethyl-1,3-cyclobutanediol and about 74 to about 83 mole % ethylene glycol; about 17 to about 25 mole % 2,2,4,4-tetramethyl-1,3-cyclobutanediol and about 75 to about 83 mole % ethylene glycol; about 17 to about 24 mole % 2,2,4,4-tetramethyl-1,3-cyclobutanediol and about 76 to about 83 mole % ethylene glycol; or about 17 to about 23 mole % 2,2,4,4-tetramethyl-1,3-cyclobutanediol and about 77 to about 83 mole % ethylene glycol; or about 16 to about 30 mole % 2,2,4,4-tetramethyl-1,3-cyclobutanediol and about 70 to about 84 mole % ethylene glycol; about 16 to about 29 mole % 2,2,4,4-tetramethyl-1,3-cyclobutanediol and about 71 to about 84 mole % ethylene glycol; about 16 to about 28 mole % 2,2,4,4-tetramethyl-1,3-cyclobutanediol and about 72 to about 84 mole % ethylene glycol; about 16 to about 27 mole % 2,2,4,4-tetramethyl-1,3-cyclobutanediol and about 73 to about 84 mole % ethylene glycol; about 16 to about 26 mole % 2,2,4,4-tetramethyl-1,3-cyclobutanediol and about 74 to about 84 mole % ethylene glycol; about 16 to about 25 mole % 2,2,4,4-tetramethyl-1,3-cyclobutanediol and about 75 to about 84 mole % ethylene glycol; about 16 to about 24 mole % 2,2,4,4-tetramethyl-1,3-cyclobutanediol and about 76 to about 84 mole % ethylene glycol; or about 15 to about 23 mole % 2,2,4,4-tetramethyl-1,3-cyclobutanediol and about 77 to about 85 mole % ethylene glycol; or about 15 to about 30 mole % 2,2,4,4-tetramethyl-1,3-cyclobutanediol and about 70 to about 85 mole % ethylene glycol; about 15 to about 29 mole % 2,2,4,4-tetramethyl-1,3-cyclobutanediol and about 71 to about 85 mole % ethylene glycol; about 15 to about 28 mole % 2,2,4,4-tetramethyl-1,3-cyclobutanediol and about 72 to about 85 mole % ethylene glycol; about 15 to about 27 mole % 2,2,4,4-tetramethyl-1,3-cyclobutanediol and about 73 to about 85 mole % ethylene glycol; about 15 to about 26 mole % 2,2,4,4-tetramethyl-1,3-cyclobutanediol and about 74 to about 85 mole % ethylene glycol; about 15 to about 25 mole % 2,2,4,4-tetramethyl-1,3-cyclobutanediol and about 75 to about 85 mole % ethylene glycol; about 15 to about 24 mole % 2,2,4,4-tetramethyl-1,3-cyclobutanediol and about 76 to about 85 mole % ethylene glycol; or about 15 to about 23 mole % 2,2,4,4-tetramethyl-1,3-cyclobutanediol and about 77 to about 85 mole % ethylene glycol; or about 14 to about 34 mole % 2,2,4,4-tetramethyl-1,3-cyclobutanediol and about 66 to about 86 mole % ethylene glycol; or about 14 to about 32 mole % 2,2,4,4-tetramethyl-1,3-cyclobutanediol and about 68 to about 86 mole % ethylene glycol; or about 14 to about 30 mole % 2,2,4,4-tetramethyl-1,3-cyclobutanediol and about 70 to about 86 mole % ethylene glycol; or about 14 to about 29 mole % 2,2,4,4-tetramethyl-1,3-cyclobutanediol and about 71 to about 86 mole % ethylene glycol; or about 14 to about 28 mole % 2,2,4,4-tetramethyl-1,3-cyclobutanediol and about 72 to about 86 mole % ethylene glycol; or about 14 to about 27 mole % 2,2,4,4-tetramethyl-1,3-cyclobutanediol and about 73 to about 86 mole % ethylene glycol; or about 14 to about 26 mole % 2,2,4,4-tetramethyl-1,3-cyclobutanediol and about 74 to about 86 mole % ethylene glycol; or about 14 to about 25 mole % 2,2,4,4-tetramethyl-1,3-cyclobutanediol and about 75 to about 86 mole % ethylene glycol; or about 14 to about 24 mole % 2,2,4,4-tetramethyl-1,3-cyclobutanediol and about 76 to about 86 mole % ethylene glycol; or about 14 to about 23 mole % 2,2,4,4-tetramethyl-1,3-cyclobutanediol and about 77 to about 86 mole % ethylene glycol; or about 13 to about 30 mole % 2,2,4,4-tetramethyl-1,3-cyclobutanediol and about 70 to about 87 mole % ethylene glycol; or about 13 to about 29 mole % 2,2,4,4-tetramethyl-1,3-cyclobutanediol and about 71 to about 87 mole % ethylene glycol; or about 13 to about 28 mole %, 2,2,4,4-tetramethyl-1,3-cyclobutanediol and about 72 to about 87 mole % ethylene glycol; or about 13 to about 27 mole % 2,2,4,4-tetramethyl-1,3-cyclobutanediol and about 73 to about 87 mole % ethylene glycol; or about 13 to about 26 mole % 2,2,4,4-tetramethyl-1,3-cyclobutanediol and about 74 to about 87 mole % ethylene glycol; or about 13 to about 25 mole % 2,2,4,4-tetramethyl-1,3-cyclobutanediol and about 75 to about 87 mole % ethylene glycol; or about 13 to about 24 mole % 2,2,4,4-tetramethyl-1,3-cyclobutanediol and about 76 to about 87 mole % ethylene glycol; or about 13 to about 23 mole % 2,2,4,4-tetramethyl-1,3-cyclobutanediol and about 77 to about 87 mole % ethylene glycol; or about 12 to about 30 mole % 2,2,4,4-tetramethyl-1,3-cyclobutanediol and about 70 to about 88 mole % ethylene glycol; or about 12 to about 29 mole % 2,2,4,4-tetramethyl-1,3-cyclobutanediol and about 71 to about 88 mole % ethylene glycol; or about 12 to about 28 mole % 2,2,4,4-tetramethyl-1,3-cyclobutanediol and about 72 to about 88 mole % ethylene glycol; or about 12 to about 27 mole % 2,2,4,4-tetramethyl-1,3-cyclobutanediol and about 73 to about 88 mole % ethylene glycol; about 12 to about 26 mole % 2,2,4,4-tetramethyl-1,3-cyclobutanediol and about 74 to about 88 mole % ethylene glycol; or about 12 to about 25 mole % 2,2,4,4-tetramethyl-1,3-cyclobutanediol and about 75 to about 88 mole % ethylene glycol; or about 12 to about 24 mole % 2,2,4,4-tetramethyl-1,3-cyclobutanediol and about 76 to about 88 mole % ethylene glycol; or about 12 to about 23 mole % 2,2,4,4-tetramethyl-1,3-cyclobutanediol and about 77 to about 88 mole % ethylene glycol; or about 11 to about 30 mole % 2,2,4,4-tetramethyl-1,3-cyclobutanediol and about 70 to about 89 mole % ethylene glycol; or about 11 to about 29 mole % 2,2,4,4-tetramethyl-1,3-cyclobutanediol and about 71 to about 89 mole % ethylene glycol; or about 11 to about 28 mole % 2,2,4,4-tetramethyl-1,3-cyclobutanediol and about 72 to about 89 mole % ethylene glycol; or about 11 to about 27 mole % 2,2,4,4-tetramethyl-1,3-cyclobutanediol and about 73 to about 89 mole % ethylene glycol; about 11 to about 26 mole % 2,2,4,4-tetramethyl-1,3-cyclobutanediol and about 74 to about 89 mole % ethylene glycol; or about 11 to about 25 mole % 2,2,4,4-tetramethyl-1,3-cyclobutanediol and about 75 to about 89 mole % ethylene glycol; or about 11 to about 24 mole % 2,2,4,4-tetramethyl-1,3-cyclobutanediol and about 76 to about 89 mole % ethylene glycol; or about 11 to about 23 mole % 2,2,4,4-tetramethyl-1,3-cyclobutanediol and about 77 to about 89 mole % ethylene glycol; or about 10 to about 30 mole % 2,2,4,4-tetramethyl-1,3-cyclobutanediol and about 70 to about 90 mole % ethylene glycol; or about 10 to about 29 mole % 2,2,4,4-tetramethyl-1,3-cyclobutanediol and about 71 to about 90 mole % ethylene glycol; or about 10 to about 28 mole % 2,2,4,4-tetramethyl-1,3-cyclobutanediol and about 72 to about 90 mole % ethylene glycol; or about 10 to about 27 mole % 2,2,4,4-tetramethyl-1,3-cyclobutanediol and about 73 to about 90 mole % ethylene glycol; about 10 to about 26 mole % 2,2,4,4-tetramethyl-1,3-cyclobutanediol and about 74 to about 90 mole % ethylene glycol; or about 10 to about 25 mole % 2,2,4,4-tetramethyl-1,3-cyclobutanediol and about 75 to about 90 mole % ethylene glycol; or about 10 to about 24 mole % 2,2,4,4-tetramethyl-1,3-cyclobutanediol and about 76 to about 90 mole % ethylene glycol; or about 10 to about 23 mole % 2,2,4,4-tetramethyl-1,3-cyclobutanediol and about 77 to about 90 mole % ethylene glycol; or about 5 to about 30 mole % 2,2,4,4-tetramethyl-1,3-cyclobutanediol and about 70 to about 95 mole % ethylene glycol; or about 5 to about 29 mole % 2,2,4,4-tetramethyl-1,3-cyclobutanediol and about 71 to about 95 mole % ethylene glycol; or about 5 to about 28 mole % 2,2,4,4-tetramethyl-1,3-cyclobutanediol and about 72 to about 95 mole % ethylene glycol; or about 5 to about 27 mole % 2,2,4,4-tetramethyl-1,3-cyclobutanediol and about 73 to about 95 mole % ethylene glycol; about 5 to about 26 mole % 2,2,4,4-tetramethyl-1,3-cyclobutanediol and about 74 to about 95 mole % ethylene glycol; or about 5 to about 25 mole % 2,2,4,4-tetramethyl-1,3-cyclobutanediol and about 75 to about 95 mole % ethylene glycol; or about 5 to about 24 mole % 2,2,4,4-tetramethyl-1,3-cyclobutanediol and about 76 to about 95 mole % ethylene glycol.

In certain embodiments of this disclosure, the glycol component for the polyesters includes but is not limited to at least one of the following combinations of ranges: 10 to 30 mole % 2,2,4,4-tetramethyl-1,3-cyclobutanediol and 70 to 90 mole % ethylene glycol; 11 to 29 mole % 2,2,4,4-tetramethyl-1,3-cyclobutanediol and 71 to 89 mole % ethylene glycol; 11 to 28 mole % 2,2,4,4-tetramethyl-1,3-cyclobutanediol and 72 to 89 mole % ethylene glycol; 15 to 29 mole % 2,2,4,4-tetramethyl-1,3-cyclobutanediol and 71 to 85 mole % ethylene glycol; 15 to 28 mole % 2,2,4,4-tetramethyl-1,3-cyclobutanediol and 72 to 75 mole % ethylene glycol; 15 to 27 mole % 2,2,4,4-tetramethyl-1,3-cyclobutanediol and 73 to 75 mole % ethylene glycol; 18 to 27 mole % 2,2,4,4-tetramethyl-1,3-cyclobutanediol and 73 to 82 mole % ethylene glycol; 19 to 26 mole % 2,2,4,4-tetramethyl-1,3-cyclobutanediol and 74 to 81 mole % ethylene glycol; 20 to 25 mole % 2,2,4,4-tetramethyl-1,3-cyclobutanediol and 75 to 80 mole % ethylene glycol; or 21 to 24 mole % 2,2,4,4-tetramethyl-1,3-cyclobutanediol and 76 to 79 mole % ethylene glycol In certain embodiments, the polyesters useful in this disclosure can include but is not limited to residues of 2,2,4,4-tetramethyl-1,3-cyclobutanediol and ethylene glycol being present in one of the following amounts: about 10 to about 42 mole % 2,2,4,4-tetramethyl-1,3-cyclobutanediol and about 58 to about 90 mole % ethylene glycol; about 15 to about 42 mole % 2,2,4,4-tetramethyl-1,3-cyclobutanediol and about 58 to about 85 mole % ethylene glycol; about 20 to about 42 mole % 2,2,4,4-tetramethyl-1,3-cyclobutanediol and about 58 to about 80 mole % ethylene glycol; about 25 to about 42 mole % 2,2,4,4-tetramethyl-1,3-cyclobutanediol and about 58 to about 75 mole % ethylene glycol; about 30 to about 42 mole % 2,2,4,4-tetramethyl-1,3-cyclobutanediol and about 58 to about 70 mole % ethylene glycol; or about 30 to about 40 mole % 2,2,4,4-tetramethyl-1,3-cyclobutanediol and about 60 to about 70 mole % ethylene glycol; or about 34.2 to about 42 mole % 2,2,4,4-tetramethyl-1,3-cyclobutanediol and about 55.8 to about 65.8 mole % ethylene glycol; or about 34.2 to about 40 mole % 2,2,4,4-tetramethyl-1,3-cyclobutanediol and about 60 to about 65.8 mole % ethylene glycol or about 34 to about 40 mole % 2,2,4,4-tetramethyl-1,3-cyclobutanediol and about 60 to about 66 mole % ethylene glycol.

In other aspects of the present disclosure, the glycol component for the polyesters useful in this disclosure include but are not limited to at least one of the following combinations of ranges: about 15 to about 30 mole % 2,2,4,4-tetramethyl-1,3-cyclobutanediol and about 85 to about 70 mole % ethylene glycol; 10 to about 30 mole % 2,2,4,4-tetramethyl-1,3-cyclobutanediol and about 90 to about 70 mole % ethylene glycol; about 10 to about 29 mole % 2,2,4,4-tetramethyl-1,3-cyclobutanediol and about 90 to about 71 mole % ethylene glycol; about 10 to about 28 mole % 2,2,4,4-tetramethyl-1,3-cyclobutanediol and about 90 to about 72 mole % ethylene glycol; about 10 to about 27 mole % 2,2,4,4-tetramethyl-1,3-cyclobutanediol and about 90 to about 73 mole % ethylene glycol; about 15 to about 28 mole % 2,2,4,4-tetramethyl-1,3-cyclobutanediol and about 85 to about 72 mole % ethylene glycol; about 15 to about 26 mole % 2,2,4,4-tetramethyl-1,3-cyclobutanediol and about 85 to about 74 mole % ethylene glycol; about 18 to about 26 mole % 2,2,4,4-tetramethyl-1,3-cyclobutanediol and about 82 to about 77 mole % ethylene glycol; about 20 to about 25 mole % 2,2,4,4-tetramethyl-1,3-cyclobutanediol and about 80 to about 75 mole % ethylene glycol; about 21 to about 24 mole % 2,2,4,4-tetramethyl-1,3-cyclobutanediol and about 79 to about 76 mole % ethylene glycol; or about 22 to about 24 mole % 2,2,4,4-tetramethyl-1,3-cyclobutanediol and about 78 to about 76 mole % ethylene glycol.

In certain aspects of the present disclosure, the glycol component of the polyester useful in this disclosure comprises 2,2,4,4-tetramethyl-1,3-cyclobutanediol (TMCD) residues in one of the following amounts: (i) about 10 to about 42 mole; (ii) about 10 to about 40 mole; (iii) about 10 to about 30 mole %; (iv) about 15 to about 30 mole %; (v) about 14 to about 34 mole %; (vi) about 30 to about 42 mole %; (vii) about 34 to about 40 mole %; (viii) about 11 to about 29 mole %; (ix) about 11 to about 28 mole %; (x) about 11 to about 27 mole %; (xi) about 11 to about 26 mole %; (xii) about 15 to about 25 mole %; (xiii) about 15 to about 28 mole %; (xiv) about 20 to about 25 mole %; or (xv) about 21 to about 24 mole %; wherein the remaining balance of the glycol component is either (a) ethylene glycol or (b) ethylene glycol and up to 30 mole %, or up to 20 mole %, or less than 20 mole %, or up to 10 mole %, or up to 8 mole %, or up to 5 mole %, or up to 2 mole % of modifying glycols.

In one embodiment, the polyesters useful in this disclosure can comprise 1,4-cyclohexanedimethanol. In one embodiment, the polyesters useful in this disclosure can comprise 1,4-cyclohexanedimethanol in the amount of less than 20 mole %. In another embodiment, the polyesters useful in this disclosure comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

In one embodiment, the glycol component of the polyester portion of the polyester compositions useful in the present disclosure can contain up to 20 mole %, or 10 mole %, or 9 mole %, or 8 mole %, or 7 mole %, or 6 mole %, or 5 mole %, or 4 mole %, or 3 mole %, or 2 mole %, or 1 mole %, or less of one or more other modifying glycols which are not 2,2,4,4-tetramethyl-1,3-cyclobutanediol or ethylene glycol. In certain embodiments, the polyesters useful in this disclosure can contain 3 mole % or less of one or more other modifying glycols. In one embodiment, the glycol component of the polyester portion of the polyester compositions can contain up to 20 mole %, 15 mole %, 10 mole %, 5 mole %, or 4 mole %, or 3 mole %, or 2 mole %, or 1 mole %, or less of one or more other modifying glycols which are not 2,2,4,4-tetramethyl-1,3-cyclobutanediol, ethylene glycol or 1,4-cyclohexanedimethanol. In another embodiment, the polyesters useful in this disclosure can contain 30 mole % or less, 20 mole % or less, 15 mole % or less, 10 mole % or less, 5 mole % or less, or 2 mole % or less, of one or more other modifying glycols. In another embodiment, the polyesters useful in this disclosure can contain 0 mole % modifying glycols. It is contemplated however that some other glycol residuals may form in situ.

In embodiments, modifying glycols for use in the polyesters, if used, can include diols other than 2,2,4,4-tetramethyl-1,3-cyclobutanediol and ethylene glycol and can contain 2 to 16 carbon atoms. Examples of other modifying glycols include, but are not limited to, cyclohexanedimethanol, diethylene glycol, 1,2-propanediol, 1,3-propanediol, neopentyl glycol, isosorbide, 1,4-butanediol, 1,5-pentanediol, 1,6-hexanediol, p-xylene glycol, polytetramethylene glycol, and mixtures thereof. In one embodiment, isosorbide is a modifying glycol. In another embodiment, the modifying glycols include, but are not limited to, at least one of 1,3-propanediol and 1,4-butanediol. In one embodiment, 1,3-propanediol and/or 1,4-butanediol can be excluded. In one embodiment, at least one modifying glycol is diethylene glycol. In one embodiment, the diethylene glycol is not added as a separate monomer but is formed during polymerization. In one embodiment, diethylene glycol residues can be present in the polyester useful in this disclosure, whether or not formed in situ during processing or intentionally added, in any amount, for example, in the amount of 0.01 to 10 mole %, or 0.01 to 8 mole %, or 0.85 to 8 mole %, or 1 to 8 mole %.

In some embodiments, the polyesters according to the present disclosure can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may optionally be added prior to and/or during and/or after the polymerization of the polyester. In embodiments, the polyester(s) useful in this disclosure can thus be linear or branched. In certain embodiments, no branching monomer or agent is added prior to and/or during and/or after the polymerization of the polyester. In some embodiments, the polyester(s) useful in this disclosure are thus linear, and not branched.

When used, examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters useful in this disclosure can comprise at least one chain extender. Suitable chain extenders include, but are not limited to, multifunctional (including, but not limited to, bifunctional) isocyanates, multifunctional epoxides, including for example epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

It is contemplated that compositions useful in the present disclosure can possess at least one of the inherent viscosity ranges described herein and at least one of the monomer ranges for the compositions described herein unless otherwise stated. It is also contemplated that compositions useful in this disclosure can possess at least one of the Tg ranges described herein and at least one of the monomer ranges for the compositions described herein unless otherwise stated. It is also contemplated that compositions useful in this disclosure can possess at least one of the inherent viscosity ranges described herein, at least one of the Tg ranges described herein, and at least one of the monomer ranges for the compositions described herein unless otherwise stated.

For embodiments of the present disclosure, the polyesters useful in this disclosure may exhibit at least one of the following inherent viscosities as determined in 60/40 (wt/wt) phenol/tetrachloroethane at a concentration of 0.25 g/50 ml at 25° C.: 0.50 to 0.80 dL/g; 0.50 to 0.75 dL/g; 0.50 to 0.70 dL/g; 0.50 to 0.68 dL/g; 0.55 to 0.80 dL/g; 0.55 to 0.75 dL/g; 0.55 to 0.70 dL/g; 0.55 to 0.68 dL/g; 0.57 to 0.68 dL/g; 0.58 to 0.67 dL/g; 0.58 to 0.66 dL/g; 0.60 to 0.75 dL/g, 0.60 to 0.72 dL/g, 0.60 to 0.70 dL/g, or 0.60 to 0.68 dL/g; 0.57 to 0.73 dL/g; 0.58 to 0.72 dL/g; 0.59 to 0.71 dL/g; 0.60 to 0.70 dL/g; 0.61 to 0.69 dL/g; 0.62 to 0.68 dL/g; 0.63 to 0.67 dL/g; 0.64 to 0.66 dL/g; or about 0.65 dL/g.

The glass transition temperature (Tg) of the polyesters is determined using a TA DSC 2920 from Thermal Analyst Instrument at a scan rate of 20° C./min.

Certain embodiments, comprise polyester compositions wherein the polyester has a Tg of 95 to 110° C.; or 97 to 108° C.; or 97 to 106° C.; or 100 to 110° C.; or 100 to 108° C.; or 100 to 106° C.; or 102 to 110° C.; or 102 to 108° C.; or 102 to 106° C.; or 103 to 110° C.; or 103 to 108° C.; or 103 to 107° C.; or 103 to 106° C.; or 104 to 110° C.; or 104 to 108° C., or 104 to 107° C.; or 104 to 106° C., or about 105° C.; 100 to 115° C.; 110 to 115° C.; or 80 to 115° C.; 80 to 105° C.; or 80 to 100° C., or 80 to less than 100° C., 80 to 99° C., or 80 to 98° C., or 80 to 97° C. or 80 to 96° C., or 80 to 95° C., or 80 to 94° C., or 80 to 93° C., or 85 to 105° C., or 85 to 100° C., or 85 to less than 100° C., or 85 to 99° C., or 85 to 98° C., or 85 to 97° C. or 85 to 96° C., or 85 to 95° C., or 85 to 94° C., or 85 to 93° C., or 86 to 100° C.; or 86 to less than 100° C., or 86 to 100° C.; or 86 to less than 100° C., or 86 to 99° C., or 86 to 98° C., or 86 to 97° C. or 86 to 96° C., or 86 to 95° C., or 86 to 94° C., or 86 to 93° C., or 87 to 99° C., or 87 to 98° C., or 87 to 97° C. or 87 to 96° C., or 87 to 95° C., or 87 to 94° C., or 87 to 93° C., or 88 to 99° C., or 88 to 98° C., or 88 to 97° C. or 88 to 96° C., or 88 to 95° C., or 88 to 94° C., or 88 to 93° C., or 90 to 95° C., or 91 to 95° C., or 92 to 94° C. In certain embodiments of this disclosure, the Tg of the polyesters can be chosen from one of the following ranges: Tg of 80 to 110° C.; or 80 to 105° C.; or 80 to 100° C.; or 80 to less than 100° C.; or 85 to less than 100° C.; or 85 to 100° C.; 86 to 99° C.; 87 to 98° C.; 88 to 97° C.; 89 to 96° C.; 90 to 95° C.; 91 to 95° C.; 92 to 94° C. In certain embodiments, these Tg ranges can be met with or without at least one plasticizer being added during polymerization.

In embodiments of this disclosure the polyester compositions can comprise a glycol component which comprises 30 to 42 mole % 2,2,4,4-tetramethyl-1,3-cyclobutanediol residues; and 58 to 70 mole % ethylene glycol residues; and inherent viscosity of 0.50 to 0.70 dL/g; and a Tg from 100 to 110° C., or from 102 to 108° C.

In embodiments of this disclosure the polyester compositions can comprise a glycol component which comprises 10 to 42 mole % 2,2,4,4-tetramethyl-1,3-cyclobutanediol residues; and 58 to 90 mole % ethylene glycol residues; an inherent viscosity from 0.60 to 0.70 dL/g; and a Tg from 90 to 92° C. or from 92 to 94° C.

In one embodiment, certain polyesters useful in this disclosure can exhibit a flexural modulus at 23° C. equal to or greater than 2000 MPa (290,000 psi) as defined by ASTM D790. In another embodiment, certain polyesters useful in this disclosure can exhibit a flexural modulus at 23° C. from about 2000 MPa (290,000 psi) to about 2551 MPa (370,000 psi) as defined by ASTM D790. In another embodiment, certain polyesters useful in this disclosure can exhibit a flexural modulus at 23° C. from about 2000 MPa (290,000 psi) to about 2413 MPA (350,000 psi) as defined by ASTM D790.

Notched Izod impact strength, as described in ASTM D256, is a common method of measuring toughness. Notched Izod impact strength is measured herein at 23° C. with a 10-mil notch in a 3.2 mm (⅛-inch) thick bar determined according to ASTM D256. In one embodiment, certain polyesters useful in this disclosure can exhibit a notched Izod impact strength of at least 25 J/m (0.47 ft-lb/in) at 23° C. with a 10-mil notch in a 3.2 mm (⅛-inch) thick bar determined according to ASTM D256. In one embodiment, certain polyesters useful in this disclosure can exhibit a notched Izod impact strength of from about 25 J/m (0.47 ft-lb/in) to about 75 J/m (1.41 ft-lb/in) at 23° C. with a 10-mil notch in a 3.2 mm (⅛-inch) thick bar determined according to ASTM D256. In another embodiment, certain polyesters useful in this disclosure can exhibit a notched Izod impact strength of from about 50 J/m (0.94 ft-lb/in) to about 75 J/m (1.41 ft-lb/in) at 23° C. with a 10-mil notch in a 3.2 mm (⅛-inch) thick bar determined according to ASTM D256.

In one embodiment, certain polyester compositions useful in this disclosure can be visually clear. The term "visually clear" is defined herein as an appreciable absence of cloudiness, haziness, and/or muddiness, when inspected visually.

In one embodiment, the polyesters useful in the present disclosure and/or the polyester compositions useful in this disclosure, [in one embodiment, in the presence of and/or in the absence of toner(s)], can have color values L*, a* and b* which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate.

In certain embodiments, the b* values for the polyesters useful in the present disclosure, can be from −12 to less than 12 and the L* values can be from greater than 80, or greater than 85, or greater than 90, or greater than 91, or greater than 92, or greater than 93, or greater than 94, or greater than 95. In other embodiments, the b* values for the polyesters useful in this disclosure can be present in one of the following ranges: from −10 to 10; −10 to less than 10; −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters useful in this disclosure can be present in one of the following ranges: 80 to 98; 85 to 98; 90 to 98; greater than 90 to 98; 91 to 98; 92 to 98; 93 to 98; 94 to 98; 95 to 98; 91 to 97; 92 to 97; 93 to 97; 94 to 97; 95 to 97; 91 to 96; 92 to 96; 93 to 96; or 94 to 96. The L* color value for the polyester can be 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

The L* value for the polyester compositions of this disclosure can be 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) transmittance mode with specular angle included, (4) large area view, (5) 1" port size, and where the measurements were performed on film.

In one embodiment, copolyesters containing 2,2,4,4-tetramethyl-1,3-cyclobutanediol and ethylene glycol over a range of compositions can be prepared with a titanium catalyst or mixture of titanium and manganese catalysts.

It is believed that the color of these copolyesters can be improved with the addition during polymerization of certain levels of phosphorus containing compounds/stabilizers. The present invention relates to polyesters based on terephthalic acid, 2,2,4,4-tetramethyl-1,3-cyclobutanediol and ethylene glycol catalyzed by certain catalyst types and/or amounts that provide improved properties (as discussed herein), and in certain embodiments a titanium catalyst, or in certain other embodiments a combination of titanium and manganese catalysts, stabilized by phosphorous compounds resulting in good TMCD incorporation, improved color (higher brightness and/or less yellow), and reactivity to achieve desired inherent viscosity (IV) over the compositional range described herein.

In certain embodiments, the polyester composition further comprises: (c) a catalyst/stabilizer component comprising: (i) titanium atoms in the range of 10-50 ppm based on polymer weight, (ii) optionally, manganese atoms in the range of 10-100 ppm based on polymer weight, and (iii) phosphorus atoms in the range of 10-200 ppm based on polymer weight. In certain embodiments, the catalyst/stabilizer component comprises: (i) titanium atoms in the range of 10-50 ppm based on polymer weight, (ii) manganese atoms in the range of 10-100 ppm based on polymer weight, and (iii) phosphorus atoms in the range of 10-200 ppm based on polymer weight. In certain embodiments, the catalyst/stabilizer component comprises no intentionally added tin, where tin may only be present as an impurity. In certain embodiments, the catalyst/stabilizer component comprises no tin, or, if present, less than 20 ppm tin, less than 10 ppm tin, less than 5 ppm tin, or less than 2 ppm tin, or less than 1 ppm tin. The catalyst/stabilizer component can result in a good combination of TMCD incorporation, reactivity to achieve a desired target IV, increased brightness and reduced yellowness that cannot be achieved when using significant amounts of tin catalyst.

When titanium is added to the polyesters and/or polyester compositions and/or process of making the polyesters useful in this disclosure, it is added to the process of making the polyester in the form of a titanium compound. The amount of the titanium compound added to the polyesters useful in this disclosure and/or polyester compositions useful in this disclosure can be measured in the form of titanium atoms present in the final polyester, for example, by weight measured in ppm.

When manganese is added to the polyesters and/or polyester compositions and/or process of making the polyesters of the present disclosure, it is added to the process of making the polyester in the form of a manganese compound. The amount of the manganese compound added to the polyesters useful in the present disclosure and/or polyester compositions useful in this disclosure can be measured in the form of manganese atoms present in the final polyester, for example, by weight measured in ppm.

When phosphorus is added to the polyesters and/or polyester compositions and/or process of making the polyesters useful in this disclosure, it is added to the process of making the polyester in the form of a phosphorus compound. In one embodiment, this phosphorus compound can comprise at least one phosphate ester(s). The amount of phosphorus compound, [for example, phosphate ester(s)] added to the polyesters useful in the present disclosure and/or polyester compositions useful in this disclosure can be measured in the form of phosphorus atoms present in the final polyester, for example, by weight measured in ppm.

In one embodiment, the phosphorus compound(s) can be an organic compound such as, for example, a phosphorus acid ester containing halogenated or non-halogenated organic substituents. In embodiments, the phosphorus compound(s) can comprise a wide range of phosphorus compounds, for example, phosphines, phosphites, phosphinites, phosphonites, phosphinates, phosphonates, phosphine oxides, and phosphates.

Examples of phosphorus compounds that may be useful in this disclosure can include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine. In one embodiment, triphenyl phosphine oxide is excluded as a thermal stabilizer in the process(es) of making the polyesters useful in the present disclosure and/or in the polyester composition(s) useful in this disclosure.

In one embodiment, phosphorus compounds useful in this disclosure can be any of the previously described phosphorus-based acids wherein one or more of the hydrogen atoms of the acid compound (bonded to either oxygen or phosphorus atoms) are replaced with alkyl, branched alkyl, substituted alkyl, alkyl ethers, substituted alkyl ethers, alkylaryl, alkyl-substituted aryl, aryl, substituted aryl, and mixtures thereof. In another embodiment, phosphorus compounds useful in this disclosure, include but are not limited to, the above described compounds wherein at least one of the hydrogen atoms bonded to an oxygen atom of the compound is replaced with a metallic ion or an ammonium ion.

The esters can contain alkyl, branched alkyl, substituted alkyl, alkyl ethers, aryl, and/or substituted aryl groups. The esters can also have at least one alkyl group and at least one aryl group. The number of ester groups present in the particular phosphorus compound can vary from zero up to the maximum allowable based on the number of hydroxyl groups present on the phosphorus compound used. For example, an alkyl phosphate ester can include one or more of the mono-, di-, and tri alkyl phosphate esters; an aryl phosphate ester includes one or more of the mono-, di-, and tri aryl phosphate esters; and an alkyl phosphate ester and/or an aryl phosphate ester also include, but are not limited to, mixed alkyl aryl phosphate esters having at least one alkyl and one aryl group.

In one embodiment, the phosphorus compounds useful in this disclosure include but are not limited to alkyl, aryl or mixed alkyl aryl esters or partial esters of phosphoric acid, phosphorus acid, phosphinic acid, phosphonic acid, or phosphonous acid. The alkyl or aryl groups can contain one or more substituents.

In one aspect, the phosphorus compounds useful in this disclosure comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed aryl alkyl phosphites, reaction products thereof, and mixtures thereof. The phosphate esters include esters in which the phosphoric acid is fully esterified or only partially esterified.

In one aspect, the phosphorus compounds useful in this disclosure comprise at least one phosphorus compound chosen from at least one of substituted or unsubstituted alkyl phosphate esters, substituted or unsubstituted aryl phosphate esters, substituted or unsubstituted mixed alkyl aryl phosphate esters, reaction products thereof, and mixtures thereof. The phosphate esters include esters in which the phosphoric acid is fully esterified or only partially esterified.

In one embodiment, for example, the phosphorus compounds useful in this disclosure can include at least one phosphate ester.

In another embodiment, the phosphate esters useful in this disclosure can include but are not limited to alkyl phosphate esters, aryl phosphate esters, mixed alkyl aryl phosphate esters, and/or mixtures thereof.

In certain embodiments, the phosphate esters useful in this disclosure are those where the groups on the phosphate ester include are alkyl, alkoxy-alkyl, phenyl, or substituted phenyl groups. These phosphate esters are generally referred to herein as alkyl and/or aryl phosphate esters. Certain preferred embodiments include trialkyl phosphates, triaryl phosphates, alkyl diaryl phosphates, dialkyl aryl phosphates, and mixtures of such phosphates, wherein the alkyl groups are preferably those containing from 2 to 12 carbon atoms, and the aryl groups are preferably phenyl.

Representative alkyl and branched alkyl groups are preferably those containing from 1-12 carbon atoms, including, but not limited to, ethyl, propyl, isopropyl, butyl, hexyl, cyclohexyl, 2-ethylhexyl, octyl, decyl and dodecyl. Substituted alkyl groups include, but are not limited to, those containing at least one of carboxylic acid groups and esters thereof, hydroxyl groups, amino groups, keto groups, and the like.

Representative of alkyl-aryl and substituted alkyl-aryl groups are those wherein the alkyl portion contains from 1-12 carbon atoms, and the aryl group is phenyl or substituted phenyl wherein groups such as alkyl, branched alkyl, aryl, hydroxyl, and the like are substituted for hydrogen at any carbon position on the phenyl ring. Preferred aryl groups include phenyl or substituted phenyl wherein groups such as alkyl, branched alkyl, aryl, hydroxyl and the like are substituted for hydrogen at any position on the phenyl ring.

In one embodiment, the phosphate esters useful in this disclosure include but are not limited to dibutylphenyl phosphate, triphenyl phosphate, tricresyl phosphate, tributyl phosphate, tri-2-ethylhexyl phosphate, trioctyl phosphate, and/or mixtures thereof, including particularly mixtures of tributyl phosphate and tricresyl phosphate, and mixtures of isocetyl diphenyl phosphate and 2-ethylhexyl diphenyl phosphate.

In one embodiment, at least one phosphorus compound useful in this disclosure comprises at least one aryl phosphate ester.

In one embodiment, at least one phosphorus compound useful in this disclosure comprises at least one unsubstituted aryl phosphate ester.

In one aspect, at least one phosphorus compound useful in this disclosure comprises at least one aryl phosphate ester which is not substituted with benzyl groups.

In one aspect, any of the phosphorus compounds useful in this disclosure may comprise at least one alkyl phosphate ester.

In one embodiment, the phosphate esters useful in this disclosure as thermal stabilizers and/or color stabilizers include but are not limited to, at least one of the following: trialkyl phosphates, triaryl phosphates, alkyl diaryl phosphates, and mixed alkyl aryl phosphates.

In one embodiment, the phosphate esters useful in this disclosure as thermal stabilizers and/or color stabilizers include but are not limited to, at least one of the following: triaryl phosphates, alkyl diaryl phosphates, and mixed alkyl aryl phosphates.

In one embodiment, the phosphate esters useful as thermal stabilizers and/or color stabilizers in this disclosure can include but are not limited to, at least one of the following: triaryl phosphates and mixed alkyl aryl phosphates.

In one embodiment, at least one phosphorus compound useful in this disclosure can comprise, but is not limited to, triaryl phosphates, such as, for example, triphenyl phosphate. In one embodiment, at least one thermal stabilizer comprises, but is not limited to Merpol A. In one embodiment, at least one thermal stabilizer useful in this disclosure comprises, but is not limited to, at least one of triphenyl phosphate and Merpol A. Merpol A is a phosphate ester commercially available from Stepan Chemical Co and/or E.I. duPont de Nemours & Co. The CAS Registry number for Merpol A is believed to be CAS Registry #37208-27-8.

In one aspect, any of the phosphorus compounds useful in this disclosure may comprise at least one triaryl phosphate ester which is not substituted with benzyl groups.

In one embodiment, the polyester compositions useful in disclosure may comprise 2-ethylhexyl diphenyl phosphate.

In one embodiment, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS #15486243-8).

In one embodiment, any of the processes described herein for making any of the polyester compositions and/or polyesters can comprise at least one phosphine oxide.

In one embodiment, any of the processes described herein for making any of the polyester compositions and/or polyesters can comprise at least one salt of phosphoric acid such as, for example, $KH_2PO_4$ and $Zn_3(PO_4)_2$.

The term "thermal stabilizer" is intended to include the reaction product(s) thereof. The term "reaction product" as used in connection with the thermal stabilizers in the polyesters useful in this disclosure refers to any product of a polycondensation or esterification reaction between the thermal stabilizer and any of the monomers used in making the polyester as well as the product of a polycondensation or esterification reaction between the catalyst and any other type of additive.

In one embodiment of this disclosure, the phosphorus compounds useful in the polyesters of this disclosure may act as thermal stabilizers. In one embodiment of this disclosure, the phosphorus compounds useful in this disclosure may not act as a thermal stabilizer but may act as a color stabilizer. In one embodiment of this disclosure, the phosphorus compounds useful in this disclosure may act as both a thermal stabilizer and a color stabilizer.

When phosphorus is added to the polyesters and/or polyester compositions and/or process of making the polyesters useful in this disclosure, it is added in the form of a phosphorus compound, for example, at least one phosphate ester(s). The amount of phosphorus compound(s), (for example, at least one phosphate ester), is added to the polyesters useful in this disclosure and/or polyester compositions useful in this disclosure and/or processes of making the polyesters useful in this disclosure can be measured in the form of phosphorus atoms present in the final polyester, for example, by weight measured in ppm.

In one embodiment, amounts of the phosphate ester useful in making the polyesters useful in this disclosure added during polymerization are chosen from the following: 10 to 200 ppm based on the total weight of the polyester composition and as measured in the form of phosphorus atoms in the final polyester. In embodiments of the polyesters useful in this disclosure, phosphorous can be present in an amount of 10 to 100, or 10 to 80, or 10 to 60, or 10 to 55, or 15 to 55, or 18 to 52, or 20 to 50 ppm, based on the total weight of the polyester composition and as measured in the form of phosphorus atoms in the final polyester.

In one embodiment, the catalyst system contains a titanium compound. In one embodiment, the titanium compound can be used in either the esterification reaction or the polycondensation reaction or both reactions. In one embodiment, the catalyst system contains a titanium compound used in the esterification reaction. In one embodiment, the catalyst system contains a titanium compound used in the polycondensation reaction. In one embodiment, less than about 50 ppm elemental titanium can be present as residue in the polyester based on the total weight of the polyester.

In embodiments, titanium amounts can range from 10 ppm to 50 ppm based on the catalyst metal and based on the weight of the final polymer. In embodiments of making the polyesters useful in this disclosure, titanium can be present in an amount of 15 to 48, or 15 to 45, or 20 to 35, or 20 to 30, or 15 to 30 ppm, based on the total weight of the polyester composition and as measured in the form of titanium atoms in the final polyester. The process can be carried out in either a batch or continuous process. In one embodiment, the process is carried out in a continuous process.

When titanium is added to the polyesters and/or polyester compositions and/or process of making the polyesters useful in this disclosure, it is added to the process of making the polyester in the form of a titanium compound. The amount of the titanium compound added to the polyesters useful in this disclosure and/or polyester compositions useful in this disclosure and/or processes for making the polyesters useful in this disclosure can be measured in the form of titanium atoms present in the final polyester, for example, by weight measured in ppm.

In another embodiment, the catalyst mixture contains a titanium compound used in the esterification reaction in the amount of 10 ppm to 50 ppm based on the weight of the final polyester, as measured in the form of titanium atoms in the final polyester.

The titanium-containing compounds useful in this disclosure include any compound containing titanium including but not limited to: tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, acetyl triisopropyl titanate, titanium tetraisopropoxide titanium glycolates, titanium butoxide, hexylene glycol titanate, and tetraisooctyl titanate, titanium dioxide, titanium dioxide/silicon dioxide coprecipitates, and titanium dioxide/zirconium dioxide coprecipitates. This disclosure includes but is not limited to the titanium dioxide/silicon dioxide coprecipitate catalyst described in U.S. Pat. No. 6,559,272.

In one embodiment, the catalyst mixture contains a magnesium compound. In one embodiment, the manganese compound can be used in either the esterification reaction or the polycondensation reaction or both reactions. In one embodiment, the catalyst system contains a manganese compound used in the esterification reaction. In one embodiment, the catalyst mixture contains a manganese compound used in the polycondensation reaction. Generally, in one embodiment, less than about 100 ppm elemental manganese can be present as residue in the polyester based on the total weight of the polyester.

Manganese amounts can range from 10 ppm to 100 ppm based on the catalyst metal and based on the weight of the final polymer. In embodiments of this disclosure, manganese can be present in the polyester in an amount of 10 to 60, or 10 to 55, or 11 to 55, or 15 to 55 ppm, based on the total weight of the polyester composition and as measured in the form of manganese atoms in the final polyester. The process can be carried out in either a batch or continuous process. In one embodiment, the process is carried out in a continuous process.

In embodiments, manganese can be added in the form of a manganese salt. In embodiments, examples of useful manganese salts include manganese(II) diacetate, manganese benzoate, manganese octoate, manganese caproate, manganese 2-diethyl hexoate, manganese lineolate, manganese stearate, manganese naphthenate, and combinations thereof.

In one embodiment, suitable catalysts for use in the processes of making the polyesters useful in this disclosure include at least one titanium compound and one manganese compound. In certain embodiments, other catalysts could possibly be used in this disclosure in combination with the at least one titanium compound and the at least one manganese compound. Other catalysts may include, but are not limited to, those based on gallium, zinc, antimony, cobalt, magnesium, germanium, lithium, aluminum compounds, and an aluminum compound with lithium hydroxide or sodium hydroxide.

The polyester portion of the polyester compositions useful in the present disclosure can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyester in general may be prepared by condensing the dicarboxylic acid or dicarboxylic acid ester with the glycol in the presence of the titanium catalyst (and optionally titanium and manganese catalysts), as described herein, at elevated temperatures increased gradually during the course of the condensation up to a temperature of about 225°-310° C., in an inert atmosphere, and conducting the condensation at low pressure during the latter part of the condensation, as described in further detail in U.S. Pat. No. 2,720,507 incorporated herein by reference herein.

In embodiments of making the polyesters useful in making the present disclosure, at least one phosphorus compound, reaction products thereof, and mixtures thereof can be added either during esterification, polycondensation, or both and/or it can be added post-polymerization. In one embodiment, the phosphorus compound useful in any of the processes of making the polyester useful in this disclosure can be added during esterification. In one embodiment, if the phosphorus compound added after both esterification and polycondensation, it is added in the amount of 0 to 2 weight % based on the total weight of the final polyester. In one embodiment, if the phosphorus compound added after both esterification and polycondensation, it is added in the amount of 0.01 to 2 weight % based on the total weight of the final polyester in one embodiment, the phosphorus compound can comprise at least one phosphate ester. In one embodiment, the phosphorus compound can comprise at least one phosphorus compound which is added during the esterification step. In one embodiment, the phosphorus compound can comprise at least one phosphate ester, for example, which is added during the esterification step.

In one aspect, the polyesters, polyester compositions useful in the present disclosure can comprise phosphorus atoms, titanium atoms, and manganese atoms.

In one embodiment, the polyester(s), polyester compositions useful in the present disclosure may comprise at least one titanium compound, at least one manganese compound, and at least one phosphorus compound.

In one embodiment, the weight ratio of total phosphorus atoms to total titanium and manganese atoms in the final polyester can be 0.5-2.0:1. In embodiments of this disclosure, phosphorus is present in a weight ratio of total phosphorus atoms to total titanium and manganese atoms in the final polyester of 0.1-5:1, or 0.2-5:1, or 0.3-2:1, or 0.3-1:1, or 0.5-0.9:1, or 0.6-0.9:1, or 0.7-0.9:1, or 0.8-0.9:1.

In one embodiment, the amount of titanium atoms in the polyesters useful in this disclosure can be from 10 to 50 ppm or 15 to 50 ppm titanium atoms based on the weight of the final polyester.

In one embodiment, the amount of manganese atoms in the polyesters useful in this disclosure can be from 10 to 100 ppm manganese atoms based on the weight of the final polyester.

In one embodiment, the amount of phosphorus atoms in the polyesters useful in this disclosure can be from 10 to 200 ppm phosphorus atoms based on the weight of the final polyester.

In certain embodiments, the polyester composition further comprises: (c) a catalyst/stabilizer component comprising: (i) titanium atoms in the range of 10-60 ppm based on polymer weight, (ii) manganese atoms in the range of 10-100 ppm based on polymer weight, and (iii) phosphorus atoms in the range of 10-200 ppm based on polymer weight. In certain embodiments, the catalyst/stabilizer can comprise tin atoms in the range of 5 to less than 25 ppm, or 5 to 20 ppm, based on polymer weight. In certain embodiments, the catalyst/stabilizer component comprises no tin, or, if present, less than 5 ppm tin, or less than 2 ppm tin, or less than 1 ppm tin. In certain embodiments, the catalyst/stabilizer does not comprise any intentionally added tin atoms, but may include tin in low levels as an impurity.

One embodiment is directed to a calendered film and/or sheet comprising a polyester composition comprising: a) a dicarboxylic acid component comprising: (i) 90 to 100 mole % terephthalic acid residues; and (ii) about 0 to about 10 mole % of aromatic and/or aliphatic dicarboxylic acid residues having up to 20 carbon atoms; and (b) a glycol component comprising: (i) about 30 to about 42 mole % 2,2,4,4-tetramethyl-1,3-cyclobutanediol (TMCD) residues; and (ii) about 70 to about 58 mole % ethylene glycol residues; and (c) a catalyst/stabilizer component comprising: (i) titanium atoms in the range of 10-60 ppm based on polymer weight, (ii) additional metal catalyst atoms selected from the group consisting of: manganese atoms in the range of 10-100 ppm based on polymer weight, tin atoms in the range of 5 to 20 ppm based on polymer weight, and a combination of the manganese and tin atoms, and (iii) phosphorus atoms in the range of 10-200 ppm based on polymer weight, wherein the total mole % of the dicarboxylic acid component is 100 mole %, and wherein the total mole % of the glycol component is 100 mole %; and wherein the inherent viscosity (IV) of the polyester is from 0.50 to 0.70 dL/g as determined in 60/40 (wt/wt) phenol/tetrachloroethane at a concentration of 0.25 g/50 ml at 25° C.

In one embodiment, the polyesters of the present disclosure can be prepared using at least one tin compound in addition to the titanium compound as catalyst(s), wherein the tin is present in an amount less than 25 ppm, or less than 20 ppm, based on the catalyst metal and based on the weight of the final polymer. In one embodiment, this combination of titanium and low level tin catalysts can contain less than 5 ppm, or less than 2 ppm, of any other intentionally added catalysts, including magnesium, based on the catalyst metal and based on the weight of the final polymer. In one embodiment, this combination of titanium and low level tin catalysts can be in the absence of any other intentionally added catalysts, including magnesium.

In embodiments where the catalyst system comprises titanium and tin (low level), or where it comprises titanium, manganese and tin, a wide variety of tin compounds can be used. For example, see U.S. Pat. No. 2,720,507, where the portion concerning tin catalysts is incorporated herein by reference. These catalysts are tin compounds containing at least one organic radical. These catalysts include compounds of both divalent or tetravalent tin.

In embodiments of the process for making the polyesters useful in the present disclosure, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm are used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

This disclosure further relates to a polymer blend. The blend comprises:
  (a) from 5 to 95 weight % of at least one of the polyesters described above; and
  (b) from 5 to 95 weight % of at least one of the polymeric components.

Suitable examples of the polymeric components include, but are not limited to, nylon; polyesters different than those described herein such as PET or modified PET (PETG); polyamides such as ZYTEL® from DuPont; polystyrene; polystyrene copolymers; styrene acrylonitrile copolymers; acrylonitrile butadiene styrene copolymers; poly(methyl methacrylate); acrylic copolymers; poly(ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly (ester-carbonates); polycarbonates such as LEXAN® (a polycarbonate from General Electric); polysulfones; polysulfone ethers; and poly(ether-ketones) of aromatic dihydroxy compounds; or mixtures of any of the foregoing polymers. The blends can be prepared by conventional processing techniques known in the art, such as melt blending or solution blending.

In embodiments, the polyester compositions and the polymer blend compositions can also contain from 0.01 to 25% by weight of the overall composition common additives such as colorants, toner(s), dyes, mold release agents, flame retardants, plasticizers, nucleating agents, stabilizers, including but not limited to, UV stabilizers, thermal stabilizers other than the phosphorus compounds describe herein, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials may be added to the compositions of this disclosure. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

In one aspect, this disclosure relates to thermoplastic articles comprising the polyester compositions and/or polymer blends of this disclosure. In certain embodiments, this disclosure relates to film(s) and/or sheets comprising the polyester compositions and/or polymer blends of this disclosure. Methods of forming the polyesters and/or blends into film(s) and/or sheet(s) are well known in the art.

Examples of film(s) and/or sheet(s) of this disclosure including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting. In one aspect, this disclosure relates to calendered film(s) and/or sheets comprising the polyester compositions and/or polymer blends of this disclosure.

In one aspect, this disclosure relates to injection molded and/or blow molded articles comprising the polyester compositions and/or polymer blends of this disclosure.

In embodiments of this disclosure, certain polyesters and/or polyester compositions of this disclosure can have a unique combination of all of the following properties: certain notched Izod impact strength, certain inherent viscosities, certain glass transition temperature (Tg), certain flexural modulus, good clarity, good color, and good dishwasher durability and mechanical properties.

In one embodiment, the processes of making the polyesters useful in this disclosure can comprise a batch or continuous process.

In one embodiment, the processes of making the polyesters useful in this disclosure comprise a continuous process.

In one aspect, the polyesters, polyester compositions and/or processes of the present disclosure can comprise phosphorus atoms and titanium atoms. In one embodiment, the polyesters, polyester compositions and/or processes of this disclosure can further comprise manganese atoms. In one embodiment, the polyesters, polyester compositions and/or processes of this disclosure can further comprise tin atoms. In embodiments of this disclosure, the polyesters, polyester compositions and/or processes of this disclosure do not contain tin atoms.

In one aspect, any of the polyester(s), polyester compositions and/or processes of this disclosure can comprise at least one titanium compound, and at least one phosphorous compound, and, optionally, at least one manganese compound.

This disclosure further relates to the polyester compositions made by the process(es) described above.

In one aspect of the present disclosure, blends the amorphous polyesters with other polymers (including other polyesters and copolyesters) are suitable for use provided that the blend has a minimum crystallization half-time of at least about 5 minutes or greater. In one embodiment, the polyesters of this disclosure are not blends.

In one embodiment, the polyesters of the present disclosure are amorphous. In one embodiment, the polyesters of the present disclosure are essentially amorphous.

Any amorphous, essentially amorphous, or semicrystalline polyesters are suitable for use in the present disclosure. In one aspect, certain polyesters useful in this disclosure can have a relatively low crystallinity. Certain polyesters useful in the present disclosure can thus have a substantially amorphous morphology, meaning that the polyesters comprise substantially unordered regions of polymer. For example, in one embodiment, any polyesters can be used in this disclosure provided that they are essentially amorphous and have a minimum crystallization half-time of at least about 5 minutes or greater. In one embodiment, the polyesters of this disclosure have a crystallization half time of at least 5 minutes or greater. The crystallization half time may be, for example, at least 7 minutes or greater, at least 10 minutes or greater, at least 12 minutes or greater, at least 20 minutes or greater, and at least 30 minutes or greater. The amorphous polyesters in the present disclosure can, in some embodiments, have crystallization half-times up to infinity.

The crystallization half time of the polyester, as used herein, may be measured using conventional methods. For example, in one embodiment, the crystallization half time may be measured using a Perkin-Elmer Model DSC-2 differential scanning calorimeter. In one embodiment, crystallization half-times can be measured using a differential scanning calorimeter according to the following procedure. A sample of about 10.0 mg of the polyester is sealed in an aluminum pan and heated at a rate of about 20° C./min to about 290° C. and held for about 2 minutes in a helium atmosphere. The sample is then cooled immediately at a rate of about 20° C./min to an isothermal crystallization temperature ranging from about 140° C. to about 200° C. with about a 10° C. interval. The crystallization half-time at each temperature is then determined as the time needed to reach the peak on the exothermic curve. The minimum crystallization half-time is taken at the temperature at which the crystallization rate is the fastest.

In one embodiment, certain polyesters useful in this disclosure can exhibit at least one of the following densities: a density of greater than 1.2 g/ml at 23° C.

In one embodiment of the present disclosure, the polyesters have a viscosity range of about 1,000 to about 1,000,000 poise measured at about 1600 C to about 2300 C and at 10 s−1 shear rate, or from about 10,000 to about 500,000 poise or from about 20,000 to about 300,000 poise. The viscosity measurements in this aspect of this disclosure are made by performing small amplitude oscillatory shear (SAOS) experiments using a Rheometrics RDA II rheometer and performing frequency sweeps over the range of 1 to 400 s−1 at multiple temperatures above the Tg as determined by ASTM D4440.

Calendering

Conventional calendering processes and equipment are suitable for use to calender the polyester compositions in this disclosure. In one embodiment of the present disclosure, the polyester compositions for calendering may comprise a molten, pellet, or powder form and is passed through a compressive nip between at least two calendering rolls at temperatures of about 80° C. to about 250° C. In one embodiment, the calender roll temperature is from about 130° C. to about 250° C., or from about 130° C. to about 180° C., or from about 160° C. to about 200° C., or from about 100° C. to about 200° C.

In one embodiment, the polyester composition is blended with at least one other additive such as processing aids, plasticizers, stabilizers, impact modifiers, biocides, flame retardants, foaming agents, blowing agents, thermal stabilizers, nucleating agents, oxidative stabilizers, UV stabilizers, UV absorbers, UV inhibitors, minerals, pigments, dyes, colorants, fillers, fibers, glass fibers, carbon fibers, waxes, fusion promoters, antioxidants, antistatic agents, additional release agents, lubricants, mold release agents, phosphorus compounds, slip agents, melt strength enhancers, additional resins, and heat distortion temperature modifiers and possibly other additives.

The mixed ingredients are plasticized in a kneader or extruder. Through heat, shearing, and pressure, the dry powders are fused to form a homogeneous, molten material. The extruder feeds the molten material in a continuous process to the top of the calendering section of the calendering line in between first and second heated calender rolls. In some embodiments, four rolls are used to form three nips or gaps. In some embodiments, for example, the rolls may be configured in an "L" shape, an inverted "L" shape", or a "Z" configuration. The rolls vary in size to accommodate different film widths. The rolls have separate temperature and speed controls. The material proceeds through the nip between the first two rolls, referred to as the feed nip. The rolls rotate in opposite directions to help spread the material across the width of the rolls. The material winds between the first and second, second and third, third and fourth rolls, etc. The gap between rolls decreases in thickness between each of the rolls such that the material is thinned between the sets of rolls as it proceeds. For some hydrolytically unstable polyesters, predrying the polyester composition or venting excess moisture during processing is desirable to prevent polymer degradation by hydrolysis. After passing through the calender section, the material moves through another series of rolls where it is stretched and gradually cooled forming a film or sheet. The material also may be embossed or annealed before cooling. The cooled material is then wound into master rolls. The resulting film or sheet, therefore, has a uniform thickness that is produced by passing the polyester composition through the compressive nips between the heated rolls. In effect, the polyester composition is squeezed between the nips which separate the rolls. Each successive nip between the calendering rolls reduces the film thickness until the final film or sheet gauge is obtained. General descriptions of calendering processes are disclosed in Jim Butschli, Packaging World, p. 26-28, June 1997 and W. V. Titow, PVC Technology, 4th Edition, pp 803-848 (1984), Elsevier Publishing Co., both incorporated herein by reference.

One embodiment provides films and/or sheets made by calendering the polyester compositions of the present disclosure which have an excellent appearance and can be used in a wide range of decorative and packaging applications. The films and sheets are readily thermoformed into various shapes for specific packaging applications for both food and non-food products. They may be printed with a wide variety of inks and may be laminated either in-line or off-line with fabrics or other plastic films or sheets. Some specific end uses would include, graphic arts, transaction cards, security cards, veneers, wall coverings, book bindings, folders and the like. In one embodiment, the calendered film(s) and/or sheet(s) can be visually clear. The term "visually clear" is defined herein as an appreciable absence of cloudiness, haziness, and/or muddiness, when inspected visually.

In one embodiment, the calendered film(s) and/or sheet(s) can be opaque with the addition of certain additives.

In one aspect, the calendered films and/or sheets comprising the polyesters of the present disclosure are useful as laminates; decorative laminates; products printed, decorated or laminated in a secondary operation; graphic arts, cards; monolayer cards; multilayer cards; transaction cards, security cards, packaging, packaging for food and non-food products; medical packaging; veneers; wall covering; window coverings; floor tiles; films; window films; stretched films; stretchable films, automotive window films; book bindings; folders; shrink films; printable films; pressure sensitive labels; stationery films; optical films; greenhouse films; photovoltaic cell films; and x-ray films.

In some embodiments, the calendered film and/or sheet of the present disclosure have Tg's from about 75° C. to about 120° C. In some embodiments, the calendered film and/or sheet of the present disclosure have Tg's of at least about 90° C. and higher. In some embodiments, the calendered film and/or sheet of the present disclosure have Tg's of at least about 100° C. and higher. In some embodiments, the calendered film and/or sheet of the present disclosure have Tg's of at least about 105° C. and higher.

In some embodiments, the calendered film and/or sheet of the present disclosure have Tg's of less than about 100° C. In some embodiments, the calendered film and/or sheet of the present disclosure have Tg's of 80 to 110° C., 80 to 105° C., 90 to 110° C., 90 to 105° C., 80 to 99° C., or 80 to 98° C., or 80 to 97° C. or 80 to 96° C., or 85 to 99° C., or 85 to 98° C., or 85 to 97° C. or 85 to 96° C. In some embodiments, the calendered film and/or sheet of the present disclosure have Tg's of 80 to 110° C., 80 to 105° C., 90 to 110° C., 90 to 105° C., 80 to 99° C., or 80 to 98° C., or 80 to 97° C. or 80 to 96° C., or 85 to 99° C., or 85 to 98° C., or 85 to 97° C. or 85 to 96° C.

For example, in one embodiment of this disclosure, the calendered film and/or sheet can comprise: a glycol component that includes 30 to 42 mole % 2,2,4,4-tetramethyl-1,3-cyclobutanediol and 58 to 70 mole % ethylene glycol, an inherent viscosity of 0.50 to 0.80 dL/g, a Tg of 100 to 110° C. In another embodiment, for example, the calendered film and/or sheet can comprise: a glycol component that includes 10 to 42 mole % 2,2,4,4-tetramethyl-1,3-cyclobutanediol and 58 to 90 mole % ethylene glycol, an inherent viscosity of 0.60 to 0.70 dL/g and a Tg of 90 to 96° C.

Release Additives

In addition to the polyester, the polyester compositions in the present disclosure also comprise at least one release additive or a release agent. The release additives in this disclosure are effective to prevent sticking of the polyester to the calendering rolls. As used herein, the term "effective" means that the polyester passes freely between the calendering rolls without wrapping itself around the rolls or producing an excessive layer of polyester on the surface of the rolls.

In one embodiment, the amount of release additive used in the polyester composition is typically about 0.1 to about 10 wt %, based on the total weight percent of the polyester composition. In one aspect, the amount of release additive used is determined by factors well known in the art and is dependent upon variations in equipment, material, process conditions, and film thickness. In one embodiment, suitable examples of release additive levels include about 0.1 to about 5 wt % and about 0.1 to about 2 wt %.

Any release additive suitable for used in a calendering process are suitable for use in the present disclosure. In one embodiment, release additives suitable for use in the present disclosure include, internal lubricants, slip agents or mixtures thereof. In another embodiment, examples of release additives, useful in the present disclosure, include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). In one embodiment, the release additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, glycerol distearate, methyl methacrylate and ethylacrylate (MMA-co-EA), or methyl methacrylate and butylacrylate (MMA-co-BA) copolymers.

In another embodiment, the release additive suitable for use comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. In one embodiment, the ratio of the fatty acid or salt of a fatty acid to the ester wax may be 1:1 or greater.

In one embodiment, the fatty acid in the release additive may comprise montanic acid in which the salt of the fatty acid may comprise one or more of: the sodium salt of montanic acid, the calcium salt of montanic acid, or the lithium salt of montanic acid. The fatty acid residue of the ester wax may comprise montanic acid. The alcohol residue of the ester wax preferably contains 2 to 28 carbon atoms. In some embodiment, examples of suitable alcohols include montanyl alcohol, ethylene glycol, butylene glycol, glycerol, and pentaerythritol. The release additive may also comprise an ester wax which has been partially saponified with a base such as, for example, calcium hydroxide.

Other Additives

In one embodiment of the present disclosure, the polyester compositions may further comprise at least one other additive (other than the release additive). For example, in one embodiment, wherein the polyester composition may further comprise at least one additive selected from the group consisting of processing aids, plasticizers, stabilizers, impact modifiers, biocides, flame retardants, foaming agents, matting agents, blowing agents, thermal stabilizers, nucleating agents, oxidative stabilizers, UV stabilizers, UV absorbers, minerals, pigments, dyes, colorants, carbon black, talc, TiO2, fillers, fibers, chopped fibers, glass fibers, glass, carbon fiber, waxes, fusion promoters, antioxidants, antistatic agents, antiblocking agents, additional release agents, lubricants, mold release agents, phosphorus compounds, slip agents, melt strength enhancers, additional resins, and heat distortion temperature modifiers. In one embodiment, suitable examples of other additive levels include about 0.1 to about 50 wt %, or about 0.1 to about 40 wt %, or about 0.1 to about 30 wt %, or about 0.1 to about 20 wt %, or about 0.1 to about 10 wt %, or about 0.1 to about 5 wt %, or about 0.1 to about 2 wt %. In one embodiment, the level of other additives will depend on the composition and the desired properties.

In one embodiment, the polyester composition of this disclosure may also comprise a plasticizer. The presence of the plasticizer is useful to enhance flexibility and the good mechanical properties of the calendered film or sheet. In one embodiment, the plasticizers also help to lower the processing temperature of the polyester and may also help to prevent sticking of the polyester composition to the calender rolls.

In one embodiment, the plasticizers may comprise one or more aromatic rings. In one embodiment, higher molecular weight plasticizers are useful to prevent smoking and loss of plasticizer during the calendering process. The range of plasticizer content will depend on the properties of the base polyester and the plasticizer. In particular, as the Tg of the polyester as predicted by the well-known Fox equation (T. G. Fox, Bull. Am. Phys. Soc., 1, 123 (1956)) decreases, the amount of plasticizer needed to obtain a polyester composition that may be calendered satisfactorily also decreases. In one embodiment, the plasticizer comprises from about 5 to about 50 weight percent (wt %) of the polyester composition based on the total weight of the polyester composition. In other embodiments, examples of plasticizer levels are about 10 to about 40 wt %, about 15 to about 40 wt %, and about 15 to about 30 wt % of the polyester composition.

In one embodiment, examples of plasticizers which may be used in the present disclosure are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. In one embodiment, examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. In one embodiment, the plasticizers also may comprise one or more benzoates, phthalates, phosphates, or isophthalates. In another embodiment, the plasticizers may comprise diethylene glycol dibenzoate, abbreviated herein as "DEGDB".

In some embodiments, the polyester compositions also may comprise a flame retardant. In some embodiments, the polyester compositions also may comprise a flame retardant which comprises Aluminum Diethyl Phosphinate and Melamine Cyanurate.

In some embodiments, the polyester compositions also may comprise a phosphorus-containing flame retardant. The phosphorus-containing flame retardants should be miscible with the polyester or the plasticized polyester. The term "miscible", as used herein," is understood to mean that the flame retardant and the plasticized polyester will mix together to form a stable mixture which will not separate into multiple phases under processing conditions or conditions of use. Thus, the term "miscible" is intended include both "soluble" mixtures, in which flame retardant and plasticized polyester form a true solution, and "compatible" mixtures, meaning that the mixture of flame retardant and plasticized polyester do not necessarily form a true solution but only a stable blend. In one embodiment, the phosphorus-containing compound is a non-halogenated, organic compound such as, for example, a phosphorus acid ester containing organic substituents. In one embodiment, useful flame retardants may comprise a wide range of phosphorus compounds such as, for example, phosphines, phosphites, phosphinites, phosphonites, phosphinates, phosphonates, phosphine oxides, and phosphates. In one embodiment, examples of phosphorus-containing flame retardants include tributyl phosphate, triethyl phosphate, tri-butoxyethyl phosphate, t-Butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants of the present disclosure include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. In one embodiment, phosphorus acids suitable for use in the present disclosure include, but are not limited to: dibenzyl phosphoric acid, dibutyl phosphoric acid, di(2-ethylhexyl)phosphoric acid, diphenyl phosphoric acid, methyl phenyl phosphoric acid, phenyl benzyl phosphoric acid, hexylphosphonic acid, phenylphosphonic acid tolylphosphonic acid, benzylphosphonic acid, 2-phenylethylphosphonic acid, methylhexylphosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more mono-esters, diesters, or triesters of phosphoric acid. In another example, the flame retardant comprises resorcinol bis(diphenyl phosphate), abbreviated herein as "RDP".

In one embodiment, the flame retardant may be added to the polyester composition at a concentration of about 5 wt % to about 40 wt % based on the total weight of the polyester composition. In another embodiment, the flame retardant levels are about 7 wt % to about 35 wt %, about 10 wt % to about 30 wt %, and about 10 wt % to about 25 wt %. In one embodiment, the flame retardant polyester compositions of the present disclosure provide a V2 or greater rating in a UL94 burn test. In another embodiment, the flame retardant polyester compositions provide a burn rate of 0 in the Federal Motor Vehicle Safety Standard 302 (typically referred to as FMVSS 302).

In some embodiments, the phosphorus-containing flame retardant may also function as a plasticizer for the polyester. In these embodiments, the flame retardant may be substituted for a portion or all of the plasticizer component of the polyester composition, depending on the flame retardant's effectiveness as a plasticizer. In some embodiments, when a plasticizing flame retardant is used, the amount of flame retardant need to achieve the desired burn rate or flame resistance of the calendered film or sheet is determined first, then the amount of plasticizer needed to produce the desired Tg of the film or sheet is adjusted.

In one embodiment, oxidative stabilizers also may be used with polyesters of the present disclosure to prevent oxidative degradation during processing of the molten or semi-molten material on the calender rolls. In one embodiment, suitable stabilizers include esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus containing stabilizers such as IRGAFOS® available from Ciba-Geigy AG and WESTON® stabilizers available from GE Specialty Chemicals. These stabilizers may be used alone or in combinations.

In one embodiment, the polyester compositions may contain dyes, pigments, fillers, matting agents, antiblocking agents, antistatic agents, blowing agents, chopped fibers, glass, impact modifiers, carbon black, talc, $TiO_2$ and the like as desired. In one embodiment, colorants, sometimes referred to as toners, may be added to impart a desired neutral hue and/or brightness to the polyester and the calendered film and/or sheet.

In some embodiments, the various additives of the polyester compositions such as, for example, the flame retardant, release additives, plasticizers, and toners, may be blended in batch, semicontinuous, or continuous processes. Small scale batches may be readily prepared in any high-intensity mixing devices well-known to those skilled in the art, such as Banbury mixers, prior to calendering. The components also may be blended in solution in an appropriate solvent. The melt blending method includes blending the polyester, plasticizer, flame retardant, additive, and any additional non-polymerized additives at a temperature sufficient to melt the polyester. In one embodiment, the blend may be cooled and pelletized for further use or the melt blend can be calendered directly from this molten blend into film or sheet. The term "melt" as used herein includes, but is not limited to, merely softening the polyester. For melt mixing methods generally known in the polymer art, see "Mixing and Compounding of Polymers" (I. Manas-Zloczower & Z. Tadmor editors, Carl Hanser Verlag Publisher, 1994, New York, N.Y.). In embodiments when colored sheet or film is desired, pigments or colorants may be included in the polyester composition during the reaction of the diol and the dicarboxylic acid or they may be melt blended with the preformed polyester. In one embodiment, the method of including colorants is to use a colorant having thermally stable organic colored compounds having reactive groups such that the colorant is copolymerized and incorporated into the polyester to improve its hue. In one embodiment, for example, colorants such as dyes which possess reactive hydroxyl and/or carboxyl groups, including, but not limited to, blue and red substituted anthraquinones, may be copolymerized into the polymer chain. In embodiments, when dyes are employed as colorants, they may be added to the polyester reaction process after an ester interchange or direct esterification reaction.

As described hereinabove, in some embodiments, the polyester composition may also comprise plasticizers and flame retardants as desired and appropriate for the intended application of the film. In one embodiment, suitable plasticizers are soluble in the polyester as indicated by dissolving a 5-mil (0.127 mm) thick film of the polyester to produce a clear solution at a temperature of 160° C. or less. In another embodiment, the suitable plasticizers are soluble in the polyester as indicated by dissolving a 5-mil (0.127 mm) thick film of the polyester to produce a clear solution at a temperature of 150° C. or less. In one embodiment, the plasticizers comprise one or more aromatic rings. In one embodiment, the plasticizers comprise one or more benzoates, phthalates, phosphates, or isophthalates. In one embodiment, examples of suitable plasticizers include, but are not limited to, neopentyl glycol dibenzoate, diethylene glycol dibenzoate, butyl benzyl phthalate; and texanol benzyl phthalate. In one embodiment, the plasticizers comprise from about 5 to about 50 weight percent (wt %) of the polyester composition based on the total weight of the polyester composition. In other embodiments, the plasticizers comprise from about 10 to about 40 wt %, about 15 to about 40 wt %, and about 15 to about 30 wt % of the polyester composition. In one embodiment, the plasticizer is diethylene glycol dibenzoate.

In one embodiment, a flame retardant may be added to the polyester composition at a concentration of about 5 wt % to about 40 wt % based on the total weight of the polyester composition. In other embodiments, the flame retardant levels are about 7 wt % to about 35 wt %, about 10 wt % to about 30 wt %, and about 10 wt % to about 25 wt % of the polyester composition. In one embodiment, the flame retardant comprises one or more monoesters, diesters, or triesters of phosphoric acid. In one embodiment, the phosphorus-containing flame retardant may also function as a plasticizer for the polyester. In another embodiment, the plasticizer comprises diethylene glycol dibenzoate and the flame retardant comprises resorcinol bis(diphenyl phosphate). In one embodiment, the calendered film and/or sheet with the flame retardant will give a V2 or greater rating in a UL94 burn test. In one embodiment, addition, the calendered film and/or sheet with the flame retardant will give a burn rate of 0 in the Federal Motor Vehicle Safety Standard 302 (typically referred to as FMVSS 302).

This disclosure can be further illustrated by the following examples, although it will be understood that these examples are included merely for purposes of illustration and are not intended to limit the scope of this disclosure unless otherwise specifically indicated.

EXAMPLES

The following tables and figures summarize experimental results of this disclosure and comparative examples:

For some polyesters (such as Polyester 4 in Table 1), the proper selection of IV and branching agents improves the processing speed of the material. However, in the present disclosure, the selection of the diol monomers used in the polymer compositions appear to have an influence on the shear thinning characteristics during calendering. These polymer compositions exhibit in increased melt strength at low shear and increased shear thinning at high shear. This means that the compositions will flow better at higher processing speeds and function as well as and in some cases better than the branched materials.

TABLE 1

Summary of Polyester Compositions Evaluated

| Polyester | Composition | Tg (° C.) of Polyester | IV of Polyester | Tg (° C.) of EG | Tg (° C.) of TMCD | Tg (° C.) of CHDM | Tg (° C.) of DEG | Tg Range (° C.) |
|---|---|---|---|---|---|---|---|---|
| 1 | EG/TMCD | 105 | 0.59 | 78 | 185 | | | 107 |
| 2 | EG/TMCD | 93 | 0.65 | 78 | 185 | | | 107 |
| 3 | Control: linear PETG - EG/CHDM | 80 | 0.76 | 78 | | 85 | | 7 |

TABLE 1-continued

Summary of Polyester Compositions Evaluated

| Polyester | Composition | Tg (° C.) of Polyester | IV of Polyester | Tg (° C.) of EG | Tg (° C.) of TMCD | Tg (° C.) of CHDM | Tg (° C.) of DEG | Tg Range (° C.) |
|---|---|---|---|---|---|---|---|---|
| 4 | Control: Branched PETG - EG/CHDM w/TMA | 80 | 0.65 | 78 | | 85 | | 7 |
| 5 | Control: EG/CHDM/DEG | 72 | 0.76 | 78 | | 85 | 40 | 45 |

**This table provides information for the glycol portions only, all of the compositions are reacted with TPA. The polyester described herein are all available from Eastman Chemical Company. Some are commercially available under the Eastman family of polyester resins known as Spectar ©, Cadence © and Embrace ©.

In a viscosity test comparison of shear rate vs viscosity, the control sample of linear PETG (Polyester 3) shows a rather flat behavior in that the melt viscosity does not change much with shear rate. In a calendering process this means that the materials resist processing, and when the speed of the process is increased then melt fracture occurs. This result is unacceptable in a calendering process. To overcome the melt fracture, the temperature of the calendering process can be increased. This increase in temperature, however, results in a loss of melt strength and makes the collection of the film at the end of the calendering process more difficult. Branched PETG (Polyester 4) shows a much higher melt viscosity at low shear rates and similar melt viscosities at high shear rates. This difference from high viscosity at low shear to low viscosity at high shear is called shear thinning.

The TMCD/EG polyester compositions in the present disclosure show similar melt behavior to the branched polyesters. It is believed that this behavior is due to the large spread in Tg for the TMCD/EG polyester compositions of the present disclosure. As shown in table 1, in the control samples-linear PETG (Polyester 3) and branched PETG (Polyester 4), the glycols (EG and CHDM) have similar Tg's of 78° C. and 85° C. when reacted with terephthalic acid, and therefore, they have a Tg spread of only 7° C. This gives a flat viscosity response to shear. On the other hand, for Polyester 1 and Polyester 2 the Tg's from the two glycols (TMCD and EG) when reacted with terephthalic acid have a spread of over 100° C. Similarly, for Polyester 5, the spread of the Tg's of the glycols when reacted with terephthalic acid is 45° C. The polyesters with increased spread in the Tg's of the glycols appears to give a similar effect in calendering properties as branching the polyester.

TABLE 2

Evaluation of materials on a two roll mill

| Component | Ex. 1 | Ex. 2 | Ex. 3 | Ex. 4 | Ex. 5 | Ex. 6 | Ex. 7 |
|---|---|---|---|---|---|---|---|
| Polyester 3 | 100 | | | | | | |
| Polyester 5 | | 100 | | | | | |
| Polyester 1 | | | | | 100 | 100 | |
| Polyester 2 | | | | 100 | | | 100 |
| Polyester 4 | | | 100 | | | | |
| Wax S | 0.45 | 0.45 | 0.45 | | 0.45 | | |
| Wax OP | 0.3 | 0.3 | 0.3 | | 0.53 | | |
| ET 132 | | | | 1 | 0.12 | | |
| AC316A | | | | | 0.12 | 0.3 | 0.3 |
| Loxiol GH4 | | | | | | 0.45 | 0.45 |
| Total (in phr) | 100.75 | 100.75 | 100.75 | 101 | 101.22 | 100.75 | 100.75 |
| DCTRM Front Temp (° C.) | 175 | 175 | 170 | 170 | 185 | 185 | 180 |
| DCTRM Back Temp (° C.) | 170 | 170 | 165 | 165 | 180 | 180 | 175 |
| Melt Fracture | | | | | | | |
| 5 rpm | Excellent | Excellent | Excellent | Very Good | Good | Excellent | Excellent |
| 10 rpm | Very Good | Excellent | Very Good | Very Good | Good | Excellent | Excellent |
| 15 rpm | Good | Very Good | Good | Very Good | Good | Good | Excellent |
| 20 rpm | Good | Good | Good | Good | Fair | Fair | Excellent |

Control Samples

The Examples 1, 2, and 3 contain the three control polyesters (Polyester 3, Polyester 4, Polyester 5) combined with 0.75 wt % release additive (RA) wax, made up of 0.45 wt % Wax S (internal lubricant) and 0.3 wt % Wax OP (external lubricant). These three Examples each consisted of 99.25 wt. % of the control Polyesters, and 0.75 wt % RA waxes.

EG/TMCD Samples

The evaluation samples of the EG/TMCD polyesters compositions of the present disclosure contained a combination of various amounts of release additives (lubricants and waxes) as summarized in Table 2.

Evaluation 260 g batches consisting of lubricants and/or waxes and individual polyesters were weighed and then melted in an Intelli-torque Brabender Mixer. The mixer body was set at 180° C. and the blades were set to rotate at 60 rpm. The batches were removed from the mixer after the peak torque was reached and fusion had been completed. The properties measured when mixing were torque and temperature as functions of time.

The batches were then transferred to a Dr. Collin Two-Roll Mill. The Two-Roll Mill was programmed to run each batch for a specific period of time. The program used started at 5 rpm and increased by amounts of 5 rpm until it reached 20 rpm. Each interval was run for 3 minutes at 5, 10, 15 and 20 rpm, reduced to 15 rpm, then reduced 5 rpm to remove the films. The front and rear roll temperatures varied depending on the polyester being tested, which is shown in Table 2. The program was run with the following parameters:

Initial Rear roll temperature: 165° C.
Initial Front roll temperature: 170° C.
Roller gap: 0.25 mm
Friction max: −20%
Gap changing rate:

$$\frac{ds}{dt} = 50 \; \frac{\mu m}{s}$$

RPM change rate:

$$\frac{dn}{dt} = 5 \; \frac{rpm}{s}$$

The following properties were measured quantitatively on the Two Roll Mill: knead temperature, front and rear roll torque, and bearing force as functions of time between the two rolls. The melt fracture properties were measured qualitatively for each batch.

The Polyesters 1-5 were all individually tested by weighing various combinations of lubricants and waxes with the polyesters in a 260 g batch as shown in Table 2. These batches were processed in the Intelli-Torque Brabender Mixer and then on the Dr. Collin Two Roll Mill. The purpose of this evaluation was to test how the EG/TMCD compositions of the present disclosure would mix with the lubricants in the Brabender and then be released for transfer to the Two Roll Mill. The batches would then be transformed into a film and tested for its calendering characteristics before and during removal. These properties were compared to the control group.

During these evaluations, the set parameters were subjected to change depending on the responses received from the polyesters tested. For the control polyesters (Polyesters 3-5), the Brabender was set to 180° C. and the blades were set to rotate at 60 rpm. The batch was fused and removed from the mixer at 185° C. The Brabender temperature was originally set to 180° C. Polyester 1-2 were tested, and if no fusion occurred, changes in Brabender temperature and/or lubricant were implemented.

While being tested on the mill, the front and rear roll temperatures would vary depending on the polyester tested. The respective temperatures are found in the Table 2. Some samples were mixed directly onto the mill without the initial mixing in the Brabender. This does not change the properties of the samples, only the ease of forming the mixture into a film.

Melt fracture is the result of the material being processed at a viscosity that does not allow the material to flow smoothly. All materials can be forced to melt fracture by lowering the processing temperature closer to the Tg of the material. The ratings in Table 2 above are from excellent (no melt fracture) to fair (the appearance of melt fracture). The better the rating means that less melt fracture occurred. The comparison of Example 1 to Example 3 shows similar melt fracture behavior for two of the polyesters compositions tested (Polyester 3 and Polyester 5). However, Example 3 was run at a temperature 5° C. lower than Example 1, and it is therefore less prone to form melt fracture. Examples 4 to 7 show the evaluation of the Polyesters 1 and 2 which comprise EG and TMCD. Examples 1 and 3 have a Tg of about 80° C. Examples 4 and 7 have a Tg of about 93° C. and Examples 5 and 6 have a Tg of about 105° C. Example 4 when compared to Example 3 showed a slightly better melt fracture response and yet has a significantly higher Tg. This means that Example 4 has better shear thinning and resistance to melt fracture while having a much higher Tg. The Polyesters 1 and 2 in Examples 4 to 7 performed better than expected. Example 7 showed the best performance in the evaluation. Example 7 was processed at a temperature of Tg+87° C., compared to Example 1 that was processed at Tg+95° C.

TABLE 3

| Frequency dependent parallel plate complex viscosity at 250° C. | | | | | |
|---|---|---|---|---|---|
| Frequency (Hz) | Polyester 1 | Polyester 2 | Polyester 3 | Polyester 4 | Polyester 5 |
| 1 | 17494.6 | 14303.1 | 9364.88 | 19587 | 12220 |
| 1.58489 | 17288.7 | 14113.5 | 9301.62 | 19109 | 12130 |
| 2.51189 | 17039.4 | 13874.8 | 9244.88 | 18542 | 12050 |
| 3.98107 | 16681.1 | 13541 | 9171.06 | 17876 | 11870 |
| 6.30957 | 16178.6 | 13080.6 | 9054.06 | 17106 | 11630 |
| 10 | 15501.2 | 12477.6 | 8876.23 | 16229 | 11280 |
| 15.8489 | 14743.3 | 11821.2 | 8644.37 | 15248 | 10840 |
| 25.1189 | 13758.5 | 10994.2 | 8361.57 | 14173 | 10310 |

TABLE 3-continued

| Frequency dependent parallel plate complex viscosity at 250° C. | | | | | |
|---|---|---|---|---|---|
| Frequency (Hz) | Polyester 1 | Polyester 2 | Polyester 3 | Polyester 4 | Polyester 5 |
| 39.8107 | 12644.2 | 10086.8 | 7972.42 | 13021 | 9676 |
| 63.0957 | 11355.1 | 9113.98 | 7503 | 11817 | 8953 |
| 100 | 10060.3 | 8049.78 | 6894.62 | 10589 | 8144 |
| 158.489 | 8738.39 | 7034.07 | 6261.46 | 9367 | 7278 |
| 251.189 | 7434.71 | 6033.69 | 5580.72 | 8183 | 6389 |
| 400 | 6195.45 | 5090.35 | 4875.68 | 7063 | 5524 |
| % of melt viscosity reduction (from 1 Hz to 400 Hz) | 65% | 64% | 48% | 64% | 55% |

Table 3 summaries the melt viscosity comparison of the control polyesters with the polyesters compositions of the present disclosure. The frequency represents the shear rate. This data shows that Polyester 3, the control-linear PETG has a relatively flat response to shear. Polyester 3 loses about 48% of its melt viscosity value from 1 Hz to 400 Hz. Polyester 1 loses 65% of its melt viscosity value and Polyester 2 loses 64%. This 64% and 65% loss is similar to Polyester 4, the control-branched PETG which also loses 64% of its melt viscosity value. Polyesters 1 and 2 which comprise the TMCD/EG composition of the present disclosure, they have higher melt viscosity at low shear rates and show an increased reduction in melt viscosity as the shear rate increases. This illustrates that Polyesters 1 and 2 have higher shear thinning (because the Tg range is higher). This is behavior normally attributed to a branched polymer system.

Two roll mill data is shown in FIGS. 1-3. FIGS. 1-3 show the rotational forces on the front roll of the two roll mill.

FIG. 1 plots the two roll mill front roll rotational torque for Polyester 3 (unbranched copolyester, Example 1), Polyester 4 (branched polyester, Example 3) and Polyester 5 (unbranched polyester, Example 2). The lines represent torque readings a 5 rpm, 10 rpm, 15 rpm and 20 rpm (going from the left to the right along the x-axis). The data for Polyester 5 show that it has less variability than Polyester 3, and it has equivalent in variability to Polyester 4. Polyester % also has lower rolling resistance when compared to Polyester 3 and Polyester 4. The less variability in the torque readings for Polyester 5 indicate that the bank of molten material between the two rolls is rolling more consistently and the lower rolling resistance indicates that Polyester 5 is exhibiting shear-thinning characteristics. Taken together, this data unexpectedly indicates that Polyester 5 (which has a 45° C. Tg range) is equal to or better in a calendering process than Polyester 3 and 4 (which have a 7° C. Tg range).

FIG. 2 plots two roll mill front roll rotational torque for Polyester 3 (linear copolyester, Example 1), Polyester 4 (branched polyester, Example 3) and Polyester 2 (unbranched EG/TMCD polyester, Example 7). The lines represent torque readings a 5 rpm, 10 rpm, 15 rpm and 20 rpm (going from the left to the right along the x-axis). The data for Polyester 2 show that is has less variability than Polyester 3, is equivalent in variability to Polyester 4, and it has lower rolling resistance when compared to Polyester 3 and Polyester 4. Less variable torque readings for Polyester 2 indicate that the bank of molten material between the two rolls is rolling more consistently and the lower rolling resistance indicates that Polyester 2 is exhibiting shear-thinning characteristics. Taken together, this data unexpectedly indicates that Polyester 2 (which has a 107° C. Tg range) is equal to or better than Polyester 3 and 4 (which has a 7° C. Tg range) in a calendering process.

FIG. 3 plots two roll mill front roll rotational torque for Polyester 3 (linear polyester, Example 1), Polyester 4 (branched polyester, Example 3) and Polyester 1 (unbranched polyester, Example 6). The lines represent torque readings a 5 rpm, 10 rpm, 15 rpm and 20 rpm (going from the left to the right along the x-axis). The data for Polyester 1 show that is has less variability than Polyester 3 at 5 and 10 rpm, is equivalent in variability to Polyester 4 at 5 and 10 rpm. Less variable torque readings for Polyester 1 indicate that the bank of molten material between the two rolls at 5 and 10 rpm is rolling more consistently than Polyester 3 and equal to Polyester 4. The data becomes more variable at 15 and 20 rpm, presumably because Polyester 1 has a much higher Tg than Polyester 3 and Polyester 4. The higher torque values for Polyester 1 can also be presumed to be because its Tg is greater than the Tg's of Polyester 3 and Polyester 4. It is unexpected that Polyester 1 which has a higher Tg than Polyester 3 and Polyester 4 performs at least equal to or better than the lower Tg polyesters in a calendering process at 5 and 10 rpm. It is believed that this result is because of the higher Tg range for the glycols in Polyester 1.

The invention claimed is:

1. A calendered film and/or sheet comprising a polyester composition comprising:
   (1) at least one polyester which comprises:
      (a) a dicarboxylic acid component comprising:
         (i) about 80 to about 100 mole % of terephthalic acid residues;
         (ii) about 0 to about 20 mole % of aromatic and/or aliphatic dicarboxylic acid residues having up to 20 carbon atoms; and
      (b) a glycol component consisting of:
         (i) about 10 to about 42 mole % 2,2,4,4-tetramethyl-1,3-cyclobutanediol residues; and
         (ii) about 58 to about 90 mole % ethylene glycol residues;
   and wherein the total mole % of the dicarboxylic acid component is 100 mole %, wherein the total mole % of the glycol component is 100 mole %; and wherein the inherent viscosity of the polyester is from 0.50 to 0.80 dL/g as determined in 60/40 (wt/wt) phenol/tetrachloroethane at a concentration of 0.25 g/50 ml at 25° C.; and wherein the polyester has a Tg of 80° C. to less than 100° C. as determined using a TA DSC 2920 from Thermal Analyst Instrument at a scan rate of 20° C./min; and wherein the polyester is amorphous or has a crystallization half-time of greater than 5 minutes; and wherein the polyester has a melt viscosity range of about 1,000 to about 1,000,000 poise measured at about 160 to about 230° C. and at 10 s$^{-1}$ shear rate; and wherein said at least one polyester further comprises:
(c) a catalyst/stabilizer component which comprises:
  (i) titanium atoms in the range of 10-50 ppm based on total polymer weight,
  (ii) manganese atoms in the range of 10-100 ppm based on total polymer weight, and
  (iii) phosphorous atoms in the range of 10-200 ppm based on total polymer weight; and
(2) at least one release additive comprising one or more of: fatty acid amides, fatty acids, fatty acid salts, fatty acid esters, hydrocarbon waxes, ester waxes, chemically modified polyolefin waxes, microcrystalline silica, or glycerin esters;

and wherein the L* color value for the polyester is greater than 90, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve; and wherein the polyester composition comprises no tin atoms.

2. The calendered film and/or sheet of claim 1, wherein the inherent viscosity of the polyester is from 0.54 to 0.68 dL/g.

3. The calendered film and/or sheet of claim 1, wherein the polyester has a Tg of 80 to 98° C.

4. The calendered film and/or sheet of claim 1, wherein the polyester composition further comprises a branching agent.

5. The calendered film and/or sheet of claim 1, wherein the polyester is made from blending two or more polyesters.

6. The calendered film and/or sheet of claim 1, wherein the polyester comprises about 34 to about 40 mole % 2,2,4,4-tetramethyl-1,3-cyclobutanediol residues; and about 50 to about 66 mole % ethylene glycol residues.

7. The calendered film and/or sheet of claim 1, wherein the polyester comprises about 15 to about 30 mole % 2,2,4,4-tetramethyl-1,3-cyclobutanediol residues and 70 to 85 mole % ethylene glycol residues.

* * * * *